United States Patent
Cui et al.

(10) Patent No.: US 10,461,359 B2
(45) Date of Patent: *Oct. 29, 2019

(54) INTERCONNECTED HOLLOW NANOSTRUCTURES CONTAINING HIGH CAPACITY ACTIVE MATERIALS FOR USE IN RECHARGEABLE BATTERIES

(71) Applicant: Amprius, Inc., Sunnyvale, CA (US)

(72) Inventors: Yi Cui, Stanford, CA (US); Song Han, Foster City, CA (US); Ghyrn E. Loveness, Mountain View, CA (US)

(73) Assignee: Amprius, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/952,744

(22) Filed: Nov. 25, 2015

(65) Prior Publication Data

US 2016/0190600 A1 Jun. 30, 2016

Related U.S. Application Data

(60) Continuation of application No. 13/891,035, filed on May 9, 2013, now Pat. No. 9,231,243, which is a
(Continued)

(51) Int. Cl.
*H01M 4/38* (2006.01)
*H01M 4/134* (2010.01)
(Continued)

(52) U.S. Cl.
CPC ......... *H01M 10/0525* (2013.01); *B82Y 30/00* (2013.01); *B82Y 40/00* (2013.01);
(Continued)

(58) Field of Classification Search
None
See application file for complete search history.

(56) References Cited

U.S. PATENT DOCUMENTS 4,436,796 A 3/1984 Huggins et al.
5,457,343 A 10/1995 Ajayan
(Continued)

FOREIGN PATENT DOCUMENTS

CN 101346834 1/2009
CN 101346836 A 1/2009
(Continued)

OTHER PUBLICATIONS

International Search report and Written Opinion dated Aug. 10, 2015, issued in Application No. PCT/US15/30336.
(Continued)

*Primary Examiner* — Jonathan Crepeau
(74) *Attorney, Agent, or Firm* — Weaver Austin Villeneuve & Sampson LLP

(57) ABSTRACT

Provided are electrode layers for use in rechargeable batteries, such as lithium ion batteries, and related fabrication techniques. These electrode layers have interconnected hollow nanostructures that contain high capacity electrochemically active materials, such as silicon, tin, and germanium. In certain embodiments, a fabrication technique involves forming a nanoscale coating around multiple template structures and at least partially removing and/or shrinking these structures to form hollow cavities. These cavities provide space for the active materials of the nanostructures to swell into during battery cycling. This design helps to reduce the risk of pulverization and to maintain electrical contacts among the nanostructures. It also provides a very high surface area available ionic communication with the electrolyte. The nanostructures have nanoscale shells but may be substantially larger in other dimensions. Nanostructures can be interconnected during forming the nanoscale coating, when the coating formed around two nearby template structures overlap.

18 Claims, 8 Drawing Sheets

Related U.S. Application Data division of application No. 12/787,138, filed on May 25, 2010, now Pat. No. 8,450,012.

(60) Provisional application No. 61/181,637, filed on May 27, 2009, provisional application No. 61/183,529, filed on Jun. 2, 2009.

(51) Int. Cl.
| | |
|---|---|
| H01M 10/0525 | (2010.01) |
| B82Y 30/00 | (2011.01) |
| B82Y 40/00 | (2011.01) |
| H01M 4/04 | (2006.01) |
| H01M 4/133 | (2010.01) |
| H01M 4/02 | (2006.01) |

(52) U.S. Cl.
CPC .......... *H01M 4/04* (2013.01); *H01M 4/0402* (2013.01); *H01M 4/043* (2013.01); *H01M 4/0438* (2013.01); *H01M 4/0471* (2013.01); *H01M 4/0492* (2013.01); *H01M 4/133* (2013.01); *H01M 4/134* (2013.01); *H01M 4/38* (2013.01); *H01M 4/386* (2013.01); *H01M 4/387* (2013.01); *H01M 4/049* (2013.01); *H01M 2004/021* (2013.01); *H01M 2004/022* (2013.01); *H01M 2004/027* (2013.01); *Y02E 60/122* (2013.01)

(56) References Cited

U.S. PATENT DOCUMENTS

| | | | |
|---|---|---|---|
| 5,997,832 | A | 12/1999 | Lieber |
| 6,083,644 | A | 7/2000 | Watanabe et al. |
| 6,090,505 | A | 7/2000 | Shimamura et al. |
| 6,190,426 | B1 | 2/2001 | Thibault et al. |
| 6,334,939 | B1 | 1/2002 | Zhou |
| 6,423,453 | B1 | 7/2002 | Noda |
| 6,514,395 | B2 | 2/2003 | Zhou |
| 6,667,099 | B1 | 12/2003 | Greiner et al. |
| 6,713,011 | B2 | 3/2004 | Chu et al. |
| 6,770,353 | B1 | 8/2004 | Mardilovich et al. |
| 7,189,476 | B1 | 3/2007 | Macklin et al. |
| 7,402,829 | B2 | 7/2008 | Green |
| 7,408,829 | B2 | 8/2008 | Kuang et al. |
| 7,438,759 | B2 | 10/2008 | Zhang et al. |
| 7,682,750 | B2 | 3/2010 | Chen |
| 7,704,480 | B2 | 4/2010 | Jiang et al. |
| 7,794,840 | B2 | 6/2010 | Grigorian et al. |
| 7,816,709 | B2 | 10/2010 | Balzano et al. |
| 7,951,489 | B2 | 5/2011 | Kim et al. |
| 8,017,272 | B2 | 9/2011 | Feng et al. |
| 8,133,832 | B2 | 3/2012 | Kristen et al. |
| 8,202,568 | B2 | 6/2012 | Lin et al. |
| 8,206,569 | B2 | 6/2012 | Lopatin et al. |
| 8,241,372 | B2 | 8/2012 | Cheng et al. |
| 8,252,245 | B2 | 8/2012 | Tonkovich et al. |
| 8,257,866 | B2 | 9/2012 | Loveness et al. |
| 8,263,258 | B2 | 9/2012 | Nakazato et al. |
| 8,367,240 | B2 | 2/2013 | Honda |
| 8,420,258 | B2 | 4/2013 | Rojeski |
| 8,450,012 | B2 * | 5/2013 | Cui .......... H01M 4/38 252/182.1 |
| 8,481,214 | B2 | 7/2013 | Rojeski |
| 8,568,914 | B2 | 10/2013 | Pol et al. |
| 8,652,683 | B2 | 2/2014 | Rojeski |
| 8,828,481 | B2 | 9/2014 | Burton et al. |
| 9,172,088 | B2 | 10/2015 | Loveness et al. |
| 9,231,243 | B2 | 1/2016 | Cui et al. |
| 9,780,365 | B2 | 10/2017 | Liu et al. |
| 9,923,201 | B2 | 3/2018 | Wang et al. |
| 10,090,512 | B2 | 10/2018 | Cui et al. |
| 2002/0061441 | A1 | 5/2002 | Ogura et al. |
| 2002/0102461 | A1 | 8/2002 | Baker et al. |
| 2002/0148727 | A1 | 10/2002 | Zhou et al. |
| 2003/0175589 | A1 | 9/2003 | Kaminaka et al. |
| 2003/0203139 | A1 | 10/2003 | Ren et al. |
| 2004/0126649 | A1 | 7/2004 | Chen et al. |
| 2004/0126659 | A1 | 7/2004 | Graetz |
| 2005/0100793 | A1 | 5/2005 | Jonghe et al. |
| 2005/0153208 | A1 | 7/2005 | Konishiike et al. |
| 2005/0238810 | A1 | 10/2005 | Scaringe et al. |
| 2005/0279274 | A1 | 12/2005 | Nui et al. |
| 2006/0035149 | A1 | 2/2006 | Nanba et al. |
| 2006/0040182 | A1 | 2/2006 | Kawakami et al. |
| 2006/0066201 | A1 | 3/2006 | Ra et al. |
| 2006/0097691 | A1 | 5/2006 | Green |
| 2006/0147797 | A1 | 7/2006 | Wu et al. |
| 2006/0154141 | A1 | 7/2006 | Salot et al. |
| 2006/0165988 | A1 | 7/2006 | Chiang et al. |
| 2006/0204853 | A1 * | 9/2006 | Chen ............ B82Y 30/00 429/231.8 |
| 2006/0216603 | A1 | 9/2006 | Choi |
| 2006/0258133 | A1 | 11/2006 | Georgiev et al. |
| 2006/0261134 | A1 | 11/2006 | Ho |
| 2007/0015061 | A1 | 1/2007 | Klaassen |
| 2007/0065720 | A1 | 3/2007 | Hasegawa et al. |
| 2007/0077433 | A1 | 4/2007 | Jeong et al. |
| 2007/0095276 | A1 | 5/2007 | Sunkara et al. |
| 2007/0154808 | A1 | 7/2007 | Konishiike et al. |
| 2007/0190422 | A1 | 8/2007 | Morris |
| 2007/0212538 | A1 | 9/2007 | Niu |
| 2007/0264574 | A1 | 11/2007 | Kim et al. |
| 2008/0003503 | A1 | 1/2008 | Kawakami et al. |
| 2008/0044732 | A1 | 2/2008 | Salot et al. |
| 2008/0087314 | A1 | 4/2008 | Xiao et al. |
| 2008/0110342 | A1 | 5/2008 | Ensor et al. |
| 2008/0110486 | A1 | 5/2008 | Tsakalakos et al. |
| 2008/0145761 | A1 | 6/2008 | Petrat et al. |
| 2008/0145762 | A1 | 6/2008 | Adachi et al. |
| 2008/0176139 | A1 | 7/2008 | White |
| 2008/0213603 | A1 | 9/2008 | Kobayashi et al. |
| 2008/0261116 | A1 | 10/2008 | Burton et al. |
| 2008/0274403 | A1 | 11/2008 | Kim et al. |
| 2008/0280169 | A1 | 11/2008 | Niu et al. |
| 2008/0280207 | A1 | 11/2008 | Patoux et al. |
| 2008/0138703 | A1 | 12/2008 | Deguchi et al. |
| 2009/0004566 | A1 | 1/2009 | Shirane et al. |
| 2009/0026662 | A1 | 1/2009 | Yun et al. |
| 2009/0042102 | A1 | 2/2009 | Cui et al. |
| 2009/0068553 | A1 | 3/2009 | Firsich |
| 2009/0117472 | A1 | 5/2009 | Iwamoto |
| 2009/0134552 | A1 | 5/2009 | Wincheski |
| 2009/0162746 | A1 | 6/2009 | Honda |
| 2009/0169996 | A1 | 7/2009 | Zhamu et al. |
| 2009/0176159 | A1 | 7/2009 | Zhamu et al. |
| 2009/0186276 | A1 | 7/2009 | Zhamu et al. |
| 2009/0188544 | A1 | 7/2009 | Kobayashi et al. |
| 2009/0214942 | A1 | 8/2009 | Frank et al. |
| 2009/0214944 | A1 | 8/2009 | Rojeski |
| 2009/0246628 | A1 | 10/2009 | Adachi et al. |
| 2009/0263716 | A1 | 10/2009 | Ramasubramanian et al. |
| 2009/0269511 | A1 | 10/2009 | Zhamu et al. |
| 2009/0291371 | A1 | 11/2009 | Konishiike et al. |
| 2009/0305131 | A1 | 12/2009 | Kumar et al. |
| 2009/0305135 | A1 | 12/2009 | Shi et al. |
| 2009/0316335 | A1 | 12/2009 | Simon et al. |
| 2010/0043877 | A1 | 2/2010 | Wang et al. |
| 2010/0122725 | A1 | 5/2010 | Buchine et al. |
| 2010/0159337 | A1 | 6/2010 | Matsumoto et al. |
| 2010/0176337 | A1 * | 7/2010 | Zhamu ............ H01M 4/1391 252/182.1 |
| 2010/0178555 | A1 | 7/2010 | Best |
| 2010/0209775 | A1 | 8/2010 | Kim et al. |
| 2010/0266897 | A1 | 10/2010 | Lee et al. |
| 2010/0285358 | A1 | 11/2010 | Cui et al. |
| 2010/0291441 | A1 | 11/2010 | Ugaji et al. |
| 2010/0310941 | A1 | 12/2010 | Kimta et al. |
| 2010/0330419 | A1 | 12/2010 | Cui et al. |
| 2010/0330421 | A1 | 12/2010 | Cui et al. |
| 2010/0330423 | A1 | 12/2010 | Cui et al. |
| 2011/0027655 | A1 | 2/2011 | Rojeski |
| 2011/0111294 | A1 | 5/2011 | Lopez et al. |

(56) References Cited

U.S. PATENT DOCUMENTS

| | | |
|---|---|---|
| 2011/0159365 A1 | 6/2011 | Loveness et al. |
| 2011/0159367 A1 | 6/2011 | Kim et al. |
| 2011/0189510 A1 | 8/2011 | Caracciolo et al. |
| 2011/0205688 A1 | 8/2011 | Ray et al. |
| 2011/0229761 A1 | 9/2011 | Cui et al. |
| 2011/0287318 A1 | 11/2011 | Loveness et al. |
| 2012/0028123 A1 | 2/2012 | Asari et al. |
| 2012/0034524 A1 | 2/2012 | Caracciolo et al. |
| 2012/0070741 A1 | 3/2012 | Liu et al. |
| 2012/0094192 A1 | 4/2012 | Jun et al. |
| 2012/0183856 A1 | 7/2012 | Cui et al. |
| 2012/0292586 A1 | 11/2012 | Yamauchi et al. |
| 2012/0301785 A1 | 11/2012 | Buchine et al. |
| 2012/0328942 A1 | 12/2012 | Thomas-Alyea et al. |
| 2013/0004657 A1 | 1/2013 | Xu et al. |
| 2013/0011736 A1 | 1/2013 | Loveness et al. |
| 2013/0078523 A1 | 3/2013 | Rojeski |
| 2013/0143124 A1 | 6/2013 | Lee et al. |
| 2013/0320582 A1 | 12/2013 | Cui et al. |
| 2013/0344383 A1 | 12/2013 | Loveness et al. |
| 2015/0325852 A1 | 11/2015 | Wang et al. |
| 2018/0090755 A1 | 3/2018 | Liu et al. |
| 2019/0058186 A1 | 2/2019 | Cui et al. |
| 2019/0088939 A1 | 3/2019 | Wang et al. |

FOREIGN PATENT DOCUMENTS

| | | |
|---|---|---|
| CN | 101356666 A | 1/2009 |
| CN | 101356670 A | 1/2009 |
| CN | 101689628 A | 3/2010 |
| CN | 101356666 B | 10/2010 |
| CN | 101953014 | 1/2011 |
| CN | 101953014 A | 1/2011 |
| CN | 101689628 B | 6/2012 |
| CN | 102959775 A | 3/2013 |
| EP | 845828 | 10/2002 |
| EP | 1494302 | 1/2005 |
| EP | 2 427 928 | 3/2012 |
| EP | 2427928 | 3/2012 |
| FR | 2880198 | 6/2006 |
| GB | 2470056 | 11/2010 |
| JP | S54-027937 | 3/1979 |
| JP | H07-211320 | 8/1995 |
| JP | H08-273660 | 10/1996 |
| JP | 2001-135317 | 5/2001 |
| JP | 2003-168426 | 6/2003 |
| JP | 2005-347076 | 12/2005 |
| JP | 2007/012310 | 1/2007 |
| JP | 2007-061945 | 3/2007 |
| JP | 2007/123100 | 5/2007 |
| JP | 2007-305569 | 11/2007 |
| JP | 2007-335198 | 12/2007 |
| JP | 2008-026595 | 2/2008 |
| JP | 2008-066128 | 3/2008 |
| JP | 2008-192594 | 8/2008 |
| JP | 2008/269827 | 11/2008 |
| JP | 2008-269827 | 11/2008 |
| JP | 2008-277128 | 11/2008 |
| JP | 2008-305781 | 12/2008 |
| JP | 2008/307581 | 12/2008 |
| JP | 2008305781 A | 12/2008 |
| JP | 2009/009206 | 1/2009 |
| JP | 2009-021226 | 1/2009 |
| JP | 2009-043514 | 2/2009 |
| JP | 2010-525549 | 7/2010 |
| JP | 2010-533945 | 10/2010 |
| JP | 2010-262752 | 11/2010 |
| JP | 2010-262754 | 11/2010 |
| JP | 2010-538444 | 12/2010 |
| JP | 2012-526364 | 10/2012 |
| JP | 2012-527735 | 11/2012 |
| JP | 2013/510405 | 3/2013 |
| JP | 5436440 | 3/2014 |
| KR | 2007-0043950 | 4/2007 |
| KR | 10-2007-0109118 | 11/2007 |
| KR | 2008-0070769 | 7/2008 |
| KR | 2009/0019339 | 2/2009 |
| KR | 2009-019339 | 2/2009 |
| KR | 20120024856 | 3/2012 |
| WO | 2006/123049 | 11/2006 |
| WO | 2007061945 A2 | 5/2007 |
| WO | 2007/071778 | 6/2007 |
| WO | 2007/083152 | 7/2007 |
| WO | 2008/044449 | 4/2008 |
| WO | 2007/083155 | 7/2008 |
| WO | 2008/139157 | 11/2008 |
| WO | 2009/008558 | 1/2009 |
| WO | 2009/010757 | 1/2009 |
| WO | 2009/010758 | 1/2009 |
| WO | 2009/010759 | 1/2009 |
| WO | 2009015804 | 2/2009 |
| WO | 2009/031715 | 3/2009 |
| WO | 2009/033015 | 3/2009 |
| WO | 2009/061685 | 5/2009 |
| WO | 2006/067957 | 6/2009 |
| WO | 2010/100599 | 9/2010 |
| WO | 2010/122910 | 10/2010 |
| WO | 2010/129910 | 11/2010 |
| WO | 2010/138617 | 12/2010 |
| WO | 2010/138619 | 12/2010 |
| WO | 2011/056847 | 5/2011 |
| WO | 2011/109477 | 9/2011 |
| WO | 2011/119614 | 9/2011 |
| WO | 2011/137446 | 11/2011 |
| WO | 2011/149958 | 12/2011 |
| WO | 2012/054767 | 4/2012 |
| WO | 2014/008433 | 1/2014 |
| WO | 2015/175509 | 11/2015 |

OTHER PUBLICATIONS

EP patent application No. 10781153.1, Supplemental Search Report and Written Opinion dated Jan. 30, 2018.
Board of Appeal Decision, dated Nov. 15, 2017, issued in U.S. Appl. No. 13/427,681.
Notice of Allowance issued in U.S. Appl. No. 14/710,103, dated Oct. 27, 2017.
U.S. Appl. No. 12/787,168, Final Office Action dated Dec. 20, 2017.
European Extended Search Report dated Dec. 22, 2017, issued in Application No. 15791953.1.
Hu L., et al. "Si nanoparticle-decorated Si nanowire networks for Li-ion battery anodes," The Royal Society of Chemistry, Chem. Commun., 2011, 47, pp. 367-369.
TW Office Action issue in Application No. 105142724, dated Nov. 13, 2017.
U.S. Appl. No. 15/887,809, filed Feb. 2, 2018, Wang et al.
U.S. Appl. No. 15/694,470, filed Sep. 7, 2017, Liu et al.
CN patent application No. 201080026302.6, Chinese Office Action dated Nov. 10, 2015.
Kim Hyesun, et al., "Superior Lithium Electroactive Mesoporous Si@Carbon Core-Shell Nanowires for Lithium Battery Anode Material," American Chemical Society, Nano Letters, 2008, vol. 8, No. 11, pp. 3688-3691.
U.S. Appl. No. 12/787,168, Final Office Action dated Apr. 11, 2016.
Korean Notice of First Refusal Ruling dated Apr. 28, 2016, KR patent application No. 10-2011-7031120.
IL patent application No. 216100, Office Action dated Jan. 20, 2016.
Huang et al., Fabrication of Silicon Nanowire Arrays with Controlled Diameter, Length, and Density, Adv. Mater., (2007), 19, 744-748.
Examiner's Answer, dated Sep. 28, 2016, issued in U.S. Appl. No. 13/427,681.
IL patent application No. 216100, Office Action (Notification of Deficiencies Prior to Allowance of Patent Application) dated Jun. 22, 2016.
U.S. Appl. No. 12/787,168, Office Action dated Mar. 9, 2017.
Magasinski, A., et al., "High-Performance Lithium-ion anodes Using a Hierarchical Botton-up Approach," Nature Material, 222. nature.com/naturematerials, Mar. 14, 2010.

(56) References Cited

OTHER PUBLICATIONS

TW patent application No. 100120433 Office Action dated Jan. 22, 2016.
TW patent application No. PCT/US2011/057159 Office Action dated Dec. 22, 2015.
U.S. Appl. No. 13/069,212, Final Office Action dated Feb. 22, 2016.
JP application No. 2013-501400, Pre-Trial Examination dated Mar. 29, 2016.
U.S. Appl. No. 13/069,212, Office Action dated May 23, 2016.
U.S. Appl. No. 13/277,821, Decision on Appeal dated Oct. 18, 2016.
JP patent application No. 2016-000227, Office Action dated Oct. 4, 2016.
KR patent application No. 10-2012-7026806 Office Action dated Jan. 18, 2017.
U.S. Appl. No. 13/069,212, Office Action dated Dec. 13, 2016.
U.S. Appl. No. 13/277,821, Notice of Allowance dated Jan. 4, 2017.
JP patent application No. 2013-501400, Office Action dated Feb. 14, 2017.
TW patent application No. 100120433 Office Action dated Mar. 17, 2017.
Cui, et al., Carbon-Silicon Core-Shell Nanowires as High Capacity Electrode for Lithium Ion Batteries, Nano Letters 9(9):3370-4 • Sep. 2009, pp. 3370-3374.
JP patent application No. 2016-000227, Office Action dated Mar. 21, 2017.
U.S. Appl. No. 12/437,529, Office Action dated Dec. 22, 2011.
Cui, Yi et al., "Doping and electrical transport in silicon nanowires", The Journal of Physical Chemistry, vol. 104, No. 22, Jun. 8, 2000.
WO patent application No. PCT/US2010/036235, International Search Report and Written Opinion dated Jan. 28, 2011.
WO patent application No. PCT/WO2010/036237, International Search Report and Written Opinion dated Feb. 1, 2011.
Frackowiak, E., et al., "Electrochemical Storage of Lithium Multiwalled Carbon Nanotubes," *Carbon* 37, 1999, pp. 61-69.
WO patent application No. PCT/US2010/034106, International Search Report and Written Opinion dated Feb. 7, 2011.
U.S. Appl. No. 12/437,529, Office Action dated May 13, 2011.
U.S. Appl. No. 12/437,529, Final Office Action dated Oct. 20, 2011.
Office Action dated Apr. 26, 2012, issued in U.S. Appl. No. 12/787,138.
Chan, et al., "High-Performance Lithium Battery Anodes Using Silicon Nanowires," *Nature Nanotechnology*, vol. 3, Jan. 2008, 5 pages.
Carbon Nanofiber Product Sheet—*Applied Science*, 2008, 1 page.
Cui, Li-Feng et al., "Crystalline-amorphous core-shell silicon nanowires for high capacity and high current battery electrodes," Nano Letters, 2009, vol. 9, No. 1 491-495, Dec. 23, 2008.
Kim, Cheol-Joo et al., "Spontaneous chemical vapor growth of NiSi nanowires and their metallic properties," Advanced Materials, 2007, 19, 3637-3642, Oct. 16, 2007.
Chan, Candace K. et al., "Surface chemistry and morphology of the solid electrolyte interphase on silicon nanowire lithium-ion battery anodes," Journal of Power Sources 189 (2009) 1132-1140.
Cui, Li-Feng et al., "Carbon-silicon core-shell nanowires as high capacity electrode for lithium ion batteries," Nano Letters, published on Aug. 5, 2009 on http://pubs.acs.org.
Esmanski, Alexei et al., "Silicon inverse-opal-based macroporous materials as negative electrodes for lithium ion batteries," Advanced Functional Materials, 2009, 1999-2010, May 7, 2009.
Park, Mi-Hee et al., "Silicon nanotube battery anodes," Nano Letters 2009, vol. 9, No. 11 3844 3847, Sep. 11, 2009.
Park, Mi-Hee et al., "Supporting information for silicon nanotube battery anodes," Nano Letters 2009, vol. 9, No. 11 3844-3847, Sep. 11, 2009.
Kim, Hyunjung et al., "Three-dimensional porous silicon particles for use in high-performance lithium secondary batteries," Angewandte Chemie, Int. Ed. 2008, 47, 10151-10154, Nov. 17, 2008.
For high-performance anode material in lithium-ion batteries, After Gutenberg, downloaded from http://jcwinnie.biz/wordpress/?p=2864 on Dec. 25, 2009.

Magasinki, A. et al., "High-performance lithium-ion anodes using a hierarchical bottom-up approach," Nature Materials, published online at www.nature.com/naturematerials Mar. 14, 2010.
Kang, Kibum et al., "The role of NiOx overlayers on spontaneous growth of NiSix nanowires from Ni seed layers," Nano Letters 2008, vol. 8, No. 2 431-436, Jan. 12, 2008.
Kang, Kibum et al., Unconventional roles of metal catalysts in chemical-vapor syntheses of singel-crystalline nanowires,: Journal of Applied Physics 105, 122407 (2009).
Zhang, Hong-Li et al., "The facile synthesis of nickel silicide nanobelts and nanosheets and their application in electrochemical energy storage," Nanotechnology 19 (2008) 165606, (7 pp), Mar. 20, 2008.
Sharma et al., "Structural characteristics and connection mechanism of gold-catalyzed bridging silicon nanowires," Journal of Crystal Growth 280 (2005) 562-568.
Levitt, "Whisker Technology." Wiley Interscience, 1970.
Li et al., "Rate capabilities of nanostructured LiMn2O4 electrodes in aqueous electrolyte." J. Electrochem. Soc. 147, 2044-2049 (2000).
Sharma et al., "Thermodynamic properties of the lithium-silicon system." Journal of the Electrochemical Society 123, 1763-1768 (Dec. 1976).
Givargizov, "Fundamental aspects of VLS growth," Journal of Crystal Growth 31, 20-30 (1975).
Goldstein et al., "Melting in semiconductor nanocrystals," Science 256, 1425-1427 (Jun. 1992).
Li et al., "A high capacity nano-Si composite anode material for lithium rechargeable batteries," Electrochemical and Solid-State Letters, 2 (11) 547-549 (1999).
Uehara et al., "Thick vacuum deposited silicon films suitable for the anode of Li-ion battery," Journal of Power Sources 146, 441-444 (2005).
Westwater et al., "Growth of silicon nanowires via gold/silane vapor-liquid-solid reaction," Journal Va. Sci. Technology B 15(3), 554-557 (May/Jun. 1997).
Yazawa et al., "Effect of one monolayer of surface gold atoms on the epitaxial growth of InAs nanowhiskers," Appl. Phys. Lett. 61 (17), 2051-2053 (Oct. 1992).
EP patent application No. 08831531.2, European Search Report dated Oct. 27, 2010.
Li et al., "Freestanding mesoporous quasi-single-crystalline Co3O4 nanowire arrays," J. Am. Chem. Soc. 2006, 128, 14258-14259, Oct. 18, 2006.
Sharma et al., "Diameter control of Ti-catalyzed silicon nanowires," Journal of Crystal Growth 267 (2004) 613-618, Apr. 20, 2004.
Pan et al., Nanobelts of Semiconduction Oxides, *Science* Mar. 9, 2001: 1947-1949.
Huang et al., Catalytic Growth of Zinc Oxide Nanowires by Vapor Transport, Adv. Mater., 13, 113-116 (2001).
Morales, et al., A Laser Ablation Method for the Synthesis of Crystalline Semiconductor Nanowires, Science vol. 279, Jan. 9, 1998.
Dick, et al A New Understanding of Au-Assisted Growth of III-V Semiconductor Nanowires, Adv. Funct. Mater. 15, 1603-1610 (2005).
Chan, C.K., et al., "High Capacity Li Lon Battery Anodes Using Ge Nanowires", Nano Letters, 2008, vol. 8, No. 1, 307-309.
Che, G., et al., "Carbon Nanotubule Membranes for Electrochemical Energy Storage and Production". Nature 393, 346-349 (1998).
Park, M.S. et al., "Preparation and Electrochemical Properties of Sn02 Nanowires for Application in Lithium-ion Batteries" Angew. Chem. Int. Edn 46, 750-753 (2007).
Huggins, R.A. & Nix, W.D. Decrepitation Model for Capacity Loss During Cycling of Alloys in Rechargeable Electrochemical Systems, Ionics 6, 57-63 (2000).
Lee, Y.M., et al. SEI layer formation on amorphous Si thin electrode during precycling. J. Electrochem. Soc. 154, A515-A519 (2007).
Green, M., et al Structured silicon anodes for lithium battery applications. Electrochem. Solid State Lett. 6, A75-A79 (2003).
Ryu, J.H., et al Failure modes of silicon powder negative electrode in lithium secondary batteries. Electrochem. Solid-State Lett. 7, A306-A309 (2004).
Gao, et al., "Alloy formation in nanostructured silicon." Adv. Mater. 13, 816-819 (2001).

(56) References Cited

OTHER PUBLICATIONS

Wang, Y., et al. Epitaxial growth of silicon nanowires using an aluminum catalyst. Nature Naotech. 1, 186-189 (2006).
Wu, Y. et al. Controlled growth and structures of molecular-scale silicon nanowires. Nao Lett. 4, 433-436 (2004).
Zhou, Controlled Li Doping of Si Nanowires (Applied Physics Letters vol. 75, No. 16), Oct. 18, 1999.
U.S. Appl. No. 13/427,681, Office Action dated Oct. 25, 2012.
Marczak et al., "The individual core/shell silicon nanowire structure probed by Raman spectroscopy", P hys. Status Solidi C 6, No. 9, 2053-2055 (2009).
Campbell et al., "Preparation of mesoporous silica templated metal nanowire films on foamed nickel substrates", Microporous and Mesoporous Materials 97 (2006) 114-121.
Final Office Action dated Oct. 11, 2012, issued in U.S. Appl. No. 12/787,138.
S.K. Samudrala and S. Bandyopadhyay: Hybrid Nanocomposite for Nanotechnology, 2009, p. 245.
U.S. Appl. No. 12/787,138, Notice of Allowance dated Jan. 28, 2013.
U.S. Appl. No. 12/787,168, Office Action dated Jan. 10, 2013.
U.S. Appl. No. 13/427,681, Office Action dated Jun. 11, 2013.
EP patent application No. 10781151.5, Supplemental European Search Report dated Jun. 28, 2013.
EP patent application No. 10781153.1, Supplemental European Search Report dated Jul. 4, 2013.
U.S. Appl. No. 12/787,168, Office Action dated Sep. 10, 2013.
U.S. Appl. No. 13/427,681, Office Action dated Oct. 2, 2013.
Chan, Candace K. et al., "Structural and electrochemical study of the reaction of lithium with silicon nanowires," Journal of Power Sources 189 (2009) 34-39.
JP patent application No. 2012-513225, Notification of Reasons for Rejection dated Dec. 17, 2013.
CN patent application No. 201080023345.9, Office Action dated Dec. 27, 2013.
U.S. Appl. No. 12/787,168, Office Action dated Feb. 26, 2014.
JP patent application No. 2012-510025, Notice of Reasons for Rejection dated Jan. 7, 2014.
JP patent application No. 2012-513226, Japanese Office Action dated Feb. 4, 2014.
CN patent application No. 201080023257.9, Chinese Office Action dated Dec. 12, 2013.
Emmenegger, et al., "Carbon Nanotubes Synthesized on Metallic Substrates," Applied Surface Science, Aug. 1, 2000, pp. 452-456.
U.S. Appl. No. 13/427,681, Office Action dated May 21, 2014.
U.S. Appl. No. 13/891,035, Office Action dated Jun. 19, 2014.
JP Application No. 2012-510025, Decision of Rejection dated Aug. 5, 2014.
U.S. Appl. No. 12/787,168, Final Office Action dated Nov. 6, 2014.
CN patent application No. 201080023257.9, Chinese Office Action dated Oct. 21, 2014.
CN patent application No. 201080023345.9, Office Action dated Sep. 11, 2014.
CN patent application No. 201080026302.6, Office Action dated Oct. 23, 2013.
CN patent application No. 201080026302.6, Office Action dated Aug. 8, 2014.
U.S. Appl. No. 13/427,681, Final Office Action dated Feb. 6, 2015.
JP patent application No. 2012-513226, Japanese Office Action dated Feb. 10, 2015.
Kasavajjula, et al., "Nano- and bulk-silicon-based insertion anodes for lithium-ion secondary cells," J. Power Sources, 163, 2007, pp. 1003-1339.
JP patent application No. 2012-513225, Decision for Grant and Allowed Claims received Jul. 17, 2014.
U.S. Appl. No. 13/891,035, Final Office Action dated Apr. 23, 2015.
Zhang, Y., et al., "Pyrolytic Carbon-Coated Silicon/Carbon Nanotube Composites: Promising Application for Li-ion Batteries," Int. J. Nanomanufacturing, vol. 2, Nos. 1/2, 2008, pp. 4-15.
CN patent application No. 201080023345.9, Office Action dated Apr. 16, 2015.
CN patent application No. 201080026302.6, Office Action dated Mar. 23 2015.
CN patent application No. 201080023257.9, Chinese Office Action dated Jun. 4, 2015.
Israel Office Action dated May 4, 2015, IL patent application No. 216100.
U.S. Appl. No. 12/787,168, Non-Final Office Action dated Jul. 7, 2015.
U.S. Appl. No. 13/891,035, Notice of Allowance dated Aug. 26, 2015.
Korean Notification of Provisional Rejection dated Aug. 19, 2015, KR patent application No. 10-2011-7031120.
Japanese Office Action dated Aug. 25, 2015, JP patent application No. 2012-513226.
Israel Office Action dated Oct. 13, 2015, IL patent application No. 216248.
U.S. Appl. No. 13/891,035, Supplemental Notice of Allowance dated Sep. 23, 2015.
U.S. Appl. No. 12/787,132, Final Office Action dated Oct. 2, 2012.
Yu, Yan et al., "Fabrication of silicon nanoparticles implanted in carbon nanofibers by electrospinning technique," 2009 ESC Abstract, 215th ECS meeting MA2009-01, May 24-May 29, 2009, San Francisco, CA.
U.S. Appl. No. 12/787,132, Office Action dated May 1, 2013.
U.S. Appl. No. 12/787,132, Office Action dated Dec. 5, 2013.
Israel Office Action dated Aug. 10, 2015, IL patent application No. 216246.
Aifantis et al., High energy density lithium batteries, 2010 WILEY-VCH Verlag GmbH & Co., KGaA, Weinheim (Chapter 6: Next—generation anodes for secondary Li—Ion Batteries).
WO patent application No. PCT/US2011/029440, International Search Report and Written Opinion dated Nov. 29, 2011.
WO patent application No. PCT/US2011/037767, International Search Report and Written Opinion dated Jan. 16, 2012.
Park et al., "Silicon nanotube battery anodes," Nano Letters, 2009, vol. 9, No. 11, 3844-3847.
Ma et al., "Nest-like silicon nanospheres for high-capacity lithium storage," Advanced Materials, 2007, 19, 4067-4070.
WO patent application No. PCT/US2011/057159, International Search Report and Written Opinion dated Jun. 11, 2012.
U.S. Appl. No. 13/277,821, Office Action dated Feb. 25, 2013.
U.S. Appl. No. 13/069,212, Office Action dated Apr. 15, 2013.
U.S. Appl. No. 13/069,212, Final Office Action dated Aug. 7, 2013.
U.S. Appl. No. 13/277,821, Office Action dated Oct. 11, 2013.
Cheng, Mu, et al. "Silicon Nanotube Array/Gold Electrode for Direct Electrochemistry of Cytochrome C," *Journal of Physical Chemistry*, vol. 111, No. 6, Feb. 15 2007, pp. 1491-1495.
U.S. Appl. No. 13/277,821, Office Action dated Apr. 10, 2014.
U.S. Appl. No. 13/069,212, Final Office Action dated Jul. 18, 2014.
U.S. Appl. No. 13/114,413, Final Office Action dated Jun. 19, 2014.
CN patent application No. 201180022062.7, Office Action dated Aug. 25, 2014.
JP patent application No. 2013-501400, Office Action dated Aug. 19, 2014.
U.S. Appl. No. 13/277,821, Final Office Action dated Nov. 20, 2014.
U.S. Appl. No. 13/069,212, Final Office Action dated Feb. 25, 2015.
U.S. Appl. No. 13/114,413, Notice of Allowance dated Jan. 22, 2015.
EP patent application No. 11760076.7, Extended Search Report dated Mar. 9, 2015.
TW patent application No. 100120433 Office Action dated Feb. 9, 2015.
CN patent application No. 201180022062.7, Office Action dated Jun. 12, 2015.
U.S. Appl. No. 13/114,413, Notice of Allowance dated Jun. 24, 2015.
US patent application No. 2013-501400, Decision of Rejection dated Sep. 1, 2015.
KR patent application No. 10-2011-7031121, Notice of Intent to Grant Application dated Jun. 16, 2015.
IL patent application No. 216100, Office Action dated Jun. 29, 2017.

(56) References Cited

OTHER PUBLICATIONS

U.S. Appl. No. 14/710,103,Office Action dated May 22, 2017.
U.S. Appl. No. 13/277,821, Notice of Allowance dated Jun. 1, 2017.
Notice of Allowance dated May 22, 2018, issued in U.S. Appl. No. 13/427,681.
CN Office Action issued in Application No. 201580032057.2 dated Aug. 31, 2018.
U.S. Appl. No. 16/109,609, filed Aug. 22, 2018, Cui et al.
TW Office Action dated Nov. 30, 2018, issued in Application No. 105142724.
U.S. Appl. No. 15/694,470, Office Action dated Apr. 16, 2019.
TW Office Action issued in Application No. 104115079 dated Nov. 19, 2018.
CN Office Action issued in Application No. 201580032057.2 dated Mar. 30, 2019.

\* cited by examiner

INTERCONNECTED HOLLOW NANOSTRUCTURES CONTAINING HIGH CAPACITY ACTIVE MATERIALS FOR USE IN RECHARGEABLE BATTERIES

CROSS-REFERENCE TO RELATED APPLICATIONS

This application is a continuation of and claims priority to U.S. patent application Ser. No. 13/891,035, filed May 9, 2013, titled "Interconnected Hollow Nanostructures Containing High Capacity Active Materials for Use in Rechargeable Batteries," which is a divisional of U.S. patent application Ser. No. 12/787,138 (now U.S. Pat. No. 8,450,012), filed May 25, 2010, titled "Interconnected Hollow Nanostructures Containing High Capacity Active Materials for Use in Rechargeable Batteries," which claims the benefit of U.S. Provisional Patent Application No. 61/181,637, filed May 27, 2009, titled "Core-Shell High Capacity Nanowires for Battery Electrodes," and also claims the benefit of U.S. Provisional Patent Application No. 61/183,529, filed Jun. 2, 2009, entitled "Electrospinning to Fabricate Battery Electrodes." Each of these prior applications is incorporated herein by reference in its entirety and for all purposes.

BACKGROUND

High capacity electrochemically active materials are desirable for battery applications. However, these materials exhibit substantial volume changes during battery cycling, e.g. swelling during lithiation and contraction during delithiation. For example, silicon swells as much as 400% during lithiation to its theoretical capacity of about 4200 mAh/g or $Li_{4.4}Si$. Volume changes of this magnitude cause pulverization of active materials structures, losses of electrical connections, and capacity fading.

Forming high capacity active materials into certain types of nanostructures can address some of these issues. Nanostructures have at least one nanoscale dimension, and swelling-contracting along this nano-dimension tends to be less destructive than along large dimensions. As such, nanostructures can remain substantially intact during battery cycling. However, integrating multiple nanostructures into a battery electrode layer that has adequate active material loadings is difficult. Such integration involves establishing and maintaining electrical interconnections and mechanical support over many cycles.

SUMMARY

Provided are electrode layers for use in rechargeable batteries, such as lithium ion batteries, and related fabrication techniques. These electrode layers have interconnected hollow nanostructures that contain high capacity electrochemically active materials, such as silicon, tin, and germanium. In certain embodiments, a fabrication technique involves forming a nanoscale coating around multiple template structures and at least partially removing and/or shrinking these structures to form hollow cavities. These cavities provide space for the active materials of the nanostructures to swell into during battery cycling. This design helps to reduce the risk of pulverization and to maintain electrical contacts among the nanostructures. It also provides a very high surface area available ionic communication with the electrolyte. The nanostructures have nanoscale shells but may be substantially larger in other dimensions. Nanostructures can be interconnected during forming the nanoscale coating, when the coating formed around two nearby template structures overlap. In certain embodiments, the electrode layer also includes a conductive substrate, which may be also interconnected with the nanostructures.

In certain embodiments, a method for preparing an electrode layer of interconnected hollow nanostructures is provided. The nanostructures include a high capacity electrochemically active material. The method may involve receiving a template that includes template structures, forming a nanoscale template coating of the high capacity material around the template structures, and, at least partially, removing and/or shrinking the template to form an electrode layer. The template may be fabricating using an electrospinning technique, e.g., electrospinning a polymeric material to form template nanofibers having a length of at least about 5 micrometers. The template may include polyacrylic nitrides (PAN), nylons, polyethylenes, polyethylene oxides, polyethylene terephthalates, polystyrenes, and/or polyvinyls. In certain embodiments, a template forms a layer having a thickness of between about 10 micrometer and 150 micrometers and a porosity of between about 20% and 80%.

In certain embodiments, a method involves pre-treating a template by compressing the template, thermally stabilizing the template, and/or carbonizing the template. For example, a template may be thermally stabilizes by heating the template in an argon atmosphere to between about 150° C. and 250° C. for at least about 2 hours. In certain embodiments, a method involves forming a nanoscale substrate coating of the high capacity materials over a conductive substrate surface adjacent to the template. The nanoscale template coating and the nanoscale substrate coating may partially overlap to interconnect the conductive substrate and the interconnected hollow nanostructures.

In certain embodiments, forming a nanoscale template coating around the template involves two deposition stages, e.g., an initial deposition stage and a bulk deposition stage. An initial deposition stage may be performed at initial process conditions such that no substantial shape distortions of the template occur during the initial deposition stage. A bulk deposition stage performed at bulk process conditions that are different from the initial process conditions. The bulk conditions may provide a higher deposition rate of the nanoscale template coating during the bulk deposition stage.

In certain embodiments, at least some removal or shrinking of a template occurs during formation the nanoscale template coating around the template structures. Partially removal or shrinking of a template may include one or more of the following operations: burning the template at a temperature of at least about 300° C. in presence of an oxidant, chemical etching the template, and annealing the template.

In certain embodiments, a method may involve forming a second coating over the interconnected hollow nanostructures. The second coating may be configured to increase an electronic conductivity of the electrode layer, improve solid electrolyte interphase (SEI) characteristics of the electrode layer, and/or to limit structural changes of the interconnected hollow nanostructures.

In certain embodiments, an electrode layer for use in a rechargeable battery includes interconnected hollow nanostructures having an aspect ratio of at least about four, a length of at least about 5 micrometers, and a shell thickness of less than about 100 nanometers. These nanostructures may include one or more high capacity electrochemically active materials. The interconnected hollow nanostructures form internal cavities that provide free space for the high capacity active material to swell into during cycling of the rechargeable battery. The internal cavities may be substantially inaccessible to an electrolyte of the rechargeable battery. In certain embodiments, the electrode layer is configured to provide a stable energy capacity of at least about 2000 mAh/g after at least 100 cycles based on the weight of the active material. An electrode layer may also include junction structures interconnecting two or more hollow nanostructures. The junction structures may include one or more of the following materials: a high capacity electrochemically active material, metal, and a polymeric binder.

In certain embodiments, an electrode layer includes a conductive substrate. Additional junction structures may interconnect some of the interconnected hollow nanostructures and conductive substrate. In certain embodiments, the active material includes silicon, tin, and/or germanium. An electrode layer may also include an outer layer substantially covering an outer surface of the interconnected hollow nanostructures. The outer layer may include carbon, titanium, silicon, aluminum, and/or copper. In certain embodiments, an electrode layer has a porosity of between about 20% and 80%. In certain embodiments, a rechargeable battery is a lithium ion battery and the active material of the electrode layer is a negative active material.

In certain embodiments, a lithium ion battery includes an electrode layer that contains interconnected hollow nanostructures having an aspect ratio of at least about four, a length of at least about 5 micrometers, and a shell thickness of less than about 100 nanometers. The hollow nanostructures may include one or more high capacity electrochemically active materials. The hollow nanostructures form internal cavities that provide free space for the high capacity active material to swell into during cycling of the rechargeable battery.

These and other aspects of the invention are described further below with reference to the figures.

DETAILED DESCRIPTION OF EXAMPLE EMBODIMENTS

Figure 1:
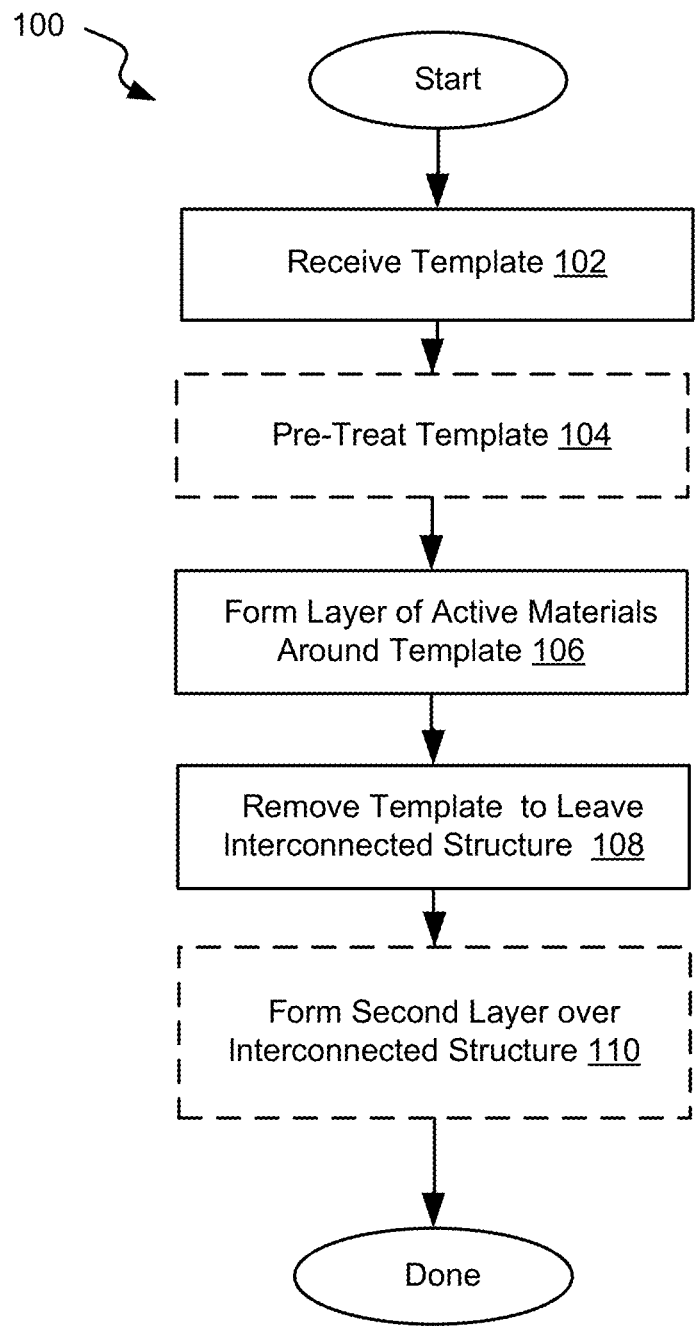
FIG. 1 is a process flowchart of a technique for preparing an electrode layer that has interconnected hollow nanostructures containing a high capacity electrochemically active material in accordance with certain embodiments.

In the following description, numerous specific details are set forth in order to provide a thorough understanding of the present invention. The present invention may be practiced without some or all of these specific details. In other instances, well known process operations have not been described in detail to not unnecessarily obscure the present invention. While the invention will be described in conjunction with the specific embodiments, it will be understood that it is not intended to limit the invention to the embodiments.

Introduction

High capacity electrochemically active materials can be formed into nanostructures for use in rechargeable batteries. Nanostructures tend to deteriorate much more slowly than larger structures during battery cycling. This is because they pulverize less readily and, therefore, maintain electrical contact the electronically conductive current collects of an electrode. Yet, producing an electrode active layer containing nanostructures with adequate active material loading is challenging. For example, it is difficult to mechanically arrange, support, and electrically interconnect a multiplicity of nanostructures and then maintain these arrangements and interconnections over a large number of cycles. For example, solid nanoparticles that are only 0.05-0.10 micrometers in diameter must rely on many electrical connections and intermediate structures for electrical conductivity to the substrate in a typical 50-100 micrometer thick active layer. Initial electrical connections formed, for example, by direct contacts between the nanoparticles and conductive additives are often lost when the nanoparticles swell during lithiation/charging. This swelling pushes apart the nanoparticles and other components. When nanoparticles shrink during delithiation/discharging, many initial connections may be lost leading to "unconnected" active particle, which effectively become "inactive". Another type of nanostructures is a nanofilm. Nanofilms are typically less than 0.1 to 0.25 micrometers thick and, therefore, can include only very small amounts of the active material per unit area of electrode face and therefore have inadequate capacity for most battery applications.

Interconnected hollow nanostructures as disclosed herein combine some favorable characteristics of the nanostructures described above and provide additional new characteristics and capabilities that were previously not attainable by solid structures. One example of hollow silicon nanostructures for use in battery electrodes are shown in FIG. 3B. These hollow nanostructures have nanoscale shells, while other dimensions could be substantially larger. For example, nanotubes can have an inner diameter of up to 5 micrometers and a length of up to 50 micrometers and sometimes even longer. These relative large nanotubes can still withstand lithiation/delithiation cycling without substantial pulverization because of their thin nanoscale shells. Such nanotubes have inside cavities available for accommodating expanding active materials. Without being restricted to any particular theory, it is believed that high capacity materials, such as amorphous silicon, exhibit different swelling/contraction behavior when arranged into hollow structures relative to other nanostructures. This difference proved to be unexpectedly beneficial to the stability of the novel nanostructures during battery cycling, which is evident from the exceptional cycle life performance of the batteries assembled with the novel electrode layers. For example, the experiment results demonstrated over 2000 mAh/g stable capacity after more than 140 cycles.

Interconnected hollow nanostructures can be prepared by forming a coating containing a high capacity material around template structures. In certain embodiments, when template structures are positioned relatively close to each other or to the substrate, the coating layers overlap forming joint structures. The template is then partially or completely removed and/or shrunk to form hollow cavities inside the nanostructures. These and other aspects of electrode layers and fabrication techniques will now be described in more detail.

Process

FIG. 1 is a process flowchart depicting a technique for preparing an electrode layer that has interconnected hollow nanostructures containing a high capacity electrochemically active material in accordance with certain embodiments. The process 100 may start with receiving a template containing multiple template structures in an operation 102. Examples of template structures include high-aspect ratio (e.g., at least about 4, 10, or 50) fibers and hollow tubes (e.g., carbon nanotubes), particles (e.g., substantially round particles), flakes, particles or spheres, and other types of template structures. Generally, a template can have any shape that provides an adequate surface for forming a high capacity material coating that can later be formed into hollow nanostructures. A principal cross-section dimension of the template structures (e.g., a diameter for fibers and particles) may be between about 1 nanometer and 5,000 nanometers or, more particularly, between about 10 nanometers and 1,000 nanometers or even more particularly between 100 nanometers and 500 nanometers. In particular embodiments, the template includes multiple randomly oriented fibers. The fibers may be straight (e.g., carbon nanotubes, carbon fibers) or curvy (e.g., electrospun polymer fibers). The fibers may be at least about 100 nanometers long on average or, more particularly, at least about 1 micrometer long or even at least about 50 micrometers.

Individual fibers or other template structures may be positioned relatively close to each other to ensure that when coating layers are deposited onto the structures, at least some of the layers overlap and form joint structures. In other words, at least some distances between template structures should be less than two thicknesses of the coating layer. Some template structures may be in a direct contact with each other. For example, a layer of randomly oriented fibers may be used as a template where each fiber will have at least two contact points with other fibers.

In certain embodiments, a template has a porosity of between about 20% and 80% or, more particularly, between about 50% and 70%. Higher porosity may be needed for depositing thicker layers and/or to form electrode layers that themselves will have high porosities (e.g., to improve electrolyte migration). The template porosity should be distinguished from the electrode layer porosity, which depends on other factors as well. In certain embodiments, template structures are attached to another common element, e.g., a substrate, such as a current collecting substrate. In these embodiments, the template structures may exist without contacting each other. For example, metal silicide nanowires can be formed on a metal substrate and used as a template. Examples of such templates are described in U.S. Provisional Patent Application No. 61/310,183, entitled "Electrochemically Active Structures Containing Silicides," filed on Mar. 3, 2010, which is incorporated by reference herein. It should be noted that such templates may still have some incidental contacts among template structures.

A template should withstand, at least initially, the process conditions used during formation of the high capacity coating. While some collapsing, shrinking, and/or other shape distortions may be allowed, the template should be capable of providing initial mechanical support for the formed coating. Any major shape distortions that would eventually prevent formation of hollow nanostructures should be avoided. This can be achieved by selecting robust template materials (e.g., heat resistant material) or controlling the coating conditions in specific ways, which is described below in more details.

Examples of template materials include various polymer materials (e.g., poly-acrylic nitrides (PAN) (as in oxidized PAN fibers), nylons, polyethylenes, polyethylene oxides, polyethylene terephthalates, polystyrenes, and polyvinyls), carbon-based materials (e.g., graphite, coke, carbon nanotubes, carbon fibers), metals (e.g., copper, nickel, aluminum), metal oxides, and metal silicides. Template materials that can be provided as electrospun fibers or any other forms are described in U.S. Provisional Patent Application No. 61/183,529, entitled "Electrospinning to Fabricate Battery Electrodes," filed Jun. 2, 2009, which is incorporated herein by reference.

A template may form a layer that has a thickness of between about 1 micrometer and 300 micrometers or, more particularly, between about 10 micrometers and 150 micrometers, or even between about 50 micrometers and 100 micrometers. This layer may define future boundaries of the electrode layer. A template layer may be formed as a discrete patch that defines dimensions (e.g., length and/or width) of the future electrode. This example is further described below in the context of FIG. 2A.

In certain embodiments, a template layer is positioned adjacent to a substrate layer prior to coating. For example, a substrate layer may be a thin foil having a thickness of between about 5 micrometers and 50 micrometers or, more particularly, between about 10 micrometers and 30 micrometers. In other embodiments, a substrate layer is a mesh, perforated sheet, foam, and the like. In these embodiments, the template may be positioned within the substrate layer, e.g., template structures are dendrites extending from the mesh wires. Examples of substrate materials include copper, coated and un-coated metal oxides, stainless steel, titanium, aluminum, nickel, chromium, tungsten, metal nitrides, metal carbides, carbon, carbon fiber, graphite, graphene, carbon mesh, conductive polymers, or combinations of the above including multi-layer structures. In certain embodiments, a substrate may have functional and/or protective layers, e.g., a catalyst layer, diffusion barrier layer, and/or adhesion layer. Various examples of such layers are described in U.S. Provisional Patent Application No. 61/260,297, entitled "Intermediate Layers for Electrode Fabrication," filed on Nov. 11, 2009, which is incorporated herein by reference.

Figure 2A:
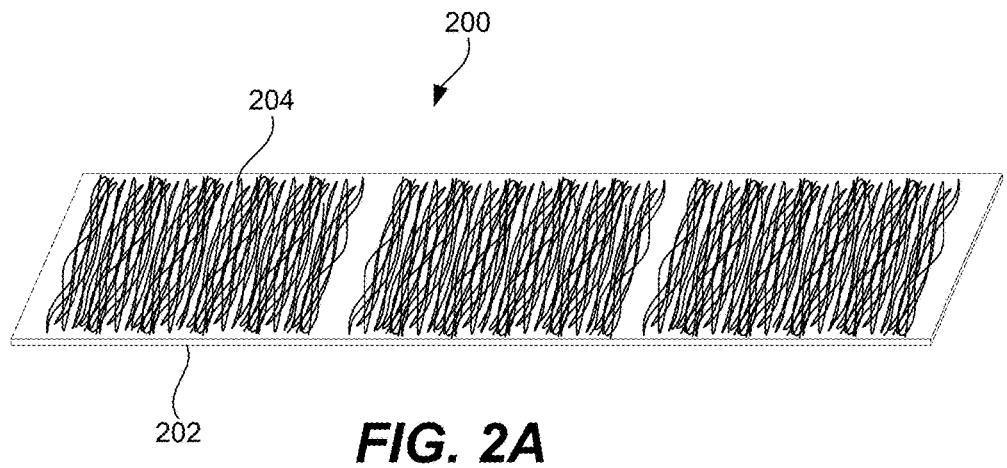
FIG. 2A illustrates a perspective schematic view of an assembly that includes a substrate and a plurality of template patches in accordance with certain embodiments.

FIG. 2A illustrates a perspective schematic view of an assembly 200 that includes a substrate 202 and a plurality of template patches 204 in accordance with certain embodiments. This assembly 200 may be formed, for example, by electrospinning template fibers directly onto the substrate 202 or depositing previously electrospun fibers onto the substrate 202. In some cases, the template patches are provided on both sides of the substrate. Various examples of active layer arrangements are described below in the context of an electrode and a battery. In certain embodiments, a template patch 204 has a length corresponding to a length or width of the final battery electrode. The support substrate 202 may be cut, at a later stage in the fabrication, in order to separate the template patches into individual electrodes.

Figure 2B:
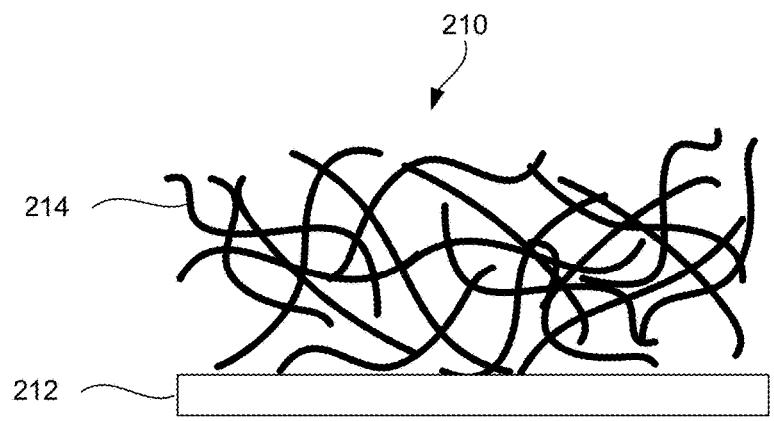
FIG. 2B illustrates a side schematic view of an assembly that includes a substrate and a plurality of template structures in accordance with certain embodiments.

FIG. 2B is a side schematic view of an assembly 210 that includes a substrate 212 and a plurality of template structures 214 in accordance with certain embodiments. Some of the template structures 214 can be substrate rooted, which can provide a mechanical connection between the template and the substrate 212. If a portion of the template later remains in the electrode layer, this substrate rooting may help to provide at least some mechanical support and/or electronic conductivity to the electrode layer. Substrate rooting can take many forms as discussed in U.S. patent application Ser. No. 12/437,529, entitled "Electrode Including Nanostructures for Rechargeable Cells", filed on May 7, 2009, which is incorporated herein by reference. In some embodiments, the template is not bonded to the substrate. Forming an active material coating may provide bonding to the substrate as explained below in the context of FIGS. 3A and 3B. Other bonding operations and/or materials may be used. For example, an adhesion layer can be formed on a substrate to enhance adhesion of active material structures to the substrate. In other embodiments, the template structures 214 are temporarily supported on the substrate 212 with, for example, a binder, which is later removed prior or during formation of the high capacity material coating. In other examples, the template structures 214 are supported on the substrate 212 using electrostatic or magnetic forces.

Returning to FIG. 1, the received template may be pre-treated in an operation 104 prior to formation of the high capacity coating. Examples of pre-treatment operations include treatments that interconnect template structures, attach the template to a substrate, achieve certain desired shapes and/or porosity characteristics of the template, thermally stabilize the template, modify composition of the template (e.g., carbonize polymers) and electrical conductivity, and accomplish various other purposes. In certain embodiments, a template is compressed to reduce its porosity or achieve a target thickness, e.g., in order to provide a higher level of interconnection among resulting hollow nanostructures. A polymer-based template may be heated to at least about 100° C. or, more particularly, to at least about 150° C. during the compression.

In the same or other embodiments, a polymer-based template may be thermally stabilized in operation 104. For example, polymer based template structures can be heated to between about 100° C. and 300° C. or, more particularly, to between about 150° C. and 250° C. for a period of between about 1 hours and 48 hours or, more particularly, between about 12 hours and 28 hours, in an inert atmosphere (e.g., argon). In certain embodiments, an oxidizing agent may be added into the chamber to form an oxide layer (e.g., for form oxidized PAN) and even partially burn out template structures to change their dimensions and/or composition.

A polymer-based template may also be partially or completely pyrolized or carbonized. For example, carbonization may help to improve thermal stability and surface properties for subsequent processing. In certain embodiments, carbonization involves heating the template to between about 300° C. and 2000° C. or, more particularly, to between about 500° C. and 1700° C., for a period between about 0.25 hours and 4 hours or, more particularly, to between about 0.5 hours and 2 hours. Carbonization or pyrolysis may be performed in various environments, which are typically inert or reducing.

The process 100 may continue with forming a nanoscale coating containing one or more high capacity active materials around the template in an operation 106. The coating may be, on average, between about 5 nanometers and 1000 nanometers thick or, more particularly, between about 10 nanometers and 500 nanometers thick or even between about 20 nanometers and 100 nanometers. This thickness may be determined, at least in part, by the composition of the coated materials and the cross-section dimension (e.g., diameter) of the shell formed by the coated materials and determined by the template dimensions, which are described above.

High capacity active materials are defined as any electrochemically active materials that have a theoretical lithiation capacity of at least about 600 mAh/g. Examples of such materials include silicon containing materials (e.g., crystalline silicon, amorphous silicon, other silicides, silicon oxides, sub-oxides, oxy-nitrides), tin-containing materials (e.g., tin, tin oxide), germanium, carbon-containing materials, metal hydrides (e.g., $MgH_2$), silicides, phosphides, and nitrides. Other examples include carbon-silicon combinations (e.g., carbon-coated silicon, silicon-coated carbon, carbon doped with silicon, silicon doped with carbon, and alloys including carbon and silicon), carbon-germanium combinations (e.g., carbon-coated germanium, germanium-coated carbon, carbon doped with germanium, and germanium doped with carbon), and carbon-tin combinations (e.g., carbon-coated tin, tin-coated carbon, carbon doped with tin, and tin doped with carbon). In certain embodiments, a coating may include active materials that do not reach the theoretical lithiation capacity listed above. These materials can be used in combination with the high capacity active materials or by themselves.

This technique may be used to form both negative and positive electrode layers. Examples of positive electrochemically active materials include various lithium metal oxides (e.g., $LiCoO_2$, $LiFePO_4$, $LiMnO_2$, $LiNiO_2$, $LiMn_2O_4$, $LiCoPO_4$, $LiNi_{1/3}Co_{1/3}Mn_{1/3}O_2$, $LiNi_xCo_yAl_zO2$, $LiFe_2(SO4)_3$), carbon fluoride, metal fluorides such as iron fluoride ($FeF_3$), metal oxide, sulfur, and combination thereof. Doped and non-stoichiometric variations of these positive and negative active materials may be used as well. Examples of dopants includes elements from the groups III and V of the periodic table (e.g., boron, aluminum, gallium, indium, thallium, phosphorous, arsenic, antimony, and bismuth) as well as other appropriate dopants (e.g., sulfur and selenium).

In certain embodiments, the coating forms multiple joint structures where at least two coating layers covering nearby template structures overlap. Furthermore, the coating may also be deposited on a substrate, if one is present near the template. In this case, join structures can also form at the substrate interface. In other words, the coating can be described as an interconnected network of multiple layers formed around the template structures and, in certain embodiments, a layer formed on the substrate surface. The layers formed around the templates in turn form shells or parts of the shells of the resulting interconnected hollow nanostructures. A particular example of this process and corresponding structures will now be explained in more detail in the context of FIGS. 3A and 3B.

Figure 3A:
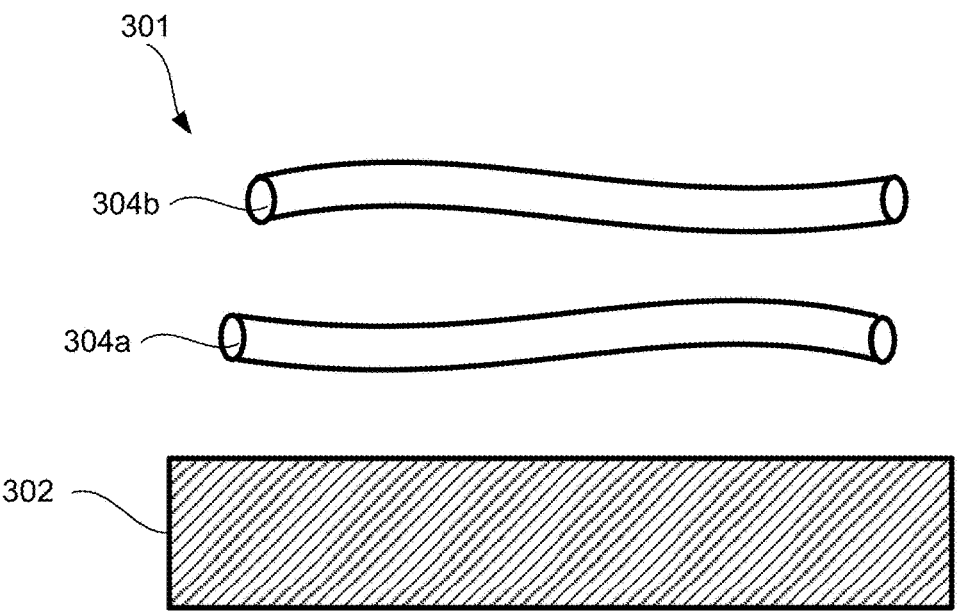
FIG. 3A is a schematic representation of a template having two template structures proximate to each other and to the substrate prior to forming a nanoscale coating containing a high capacity material in accordance with certain embodiments.
Figure 3B:
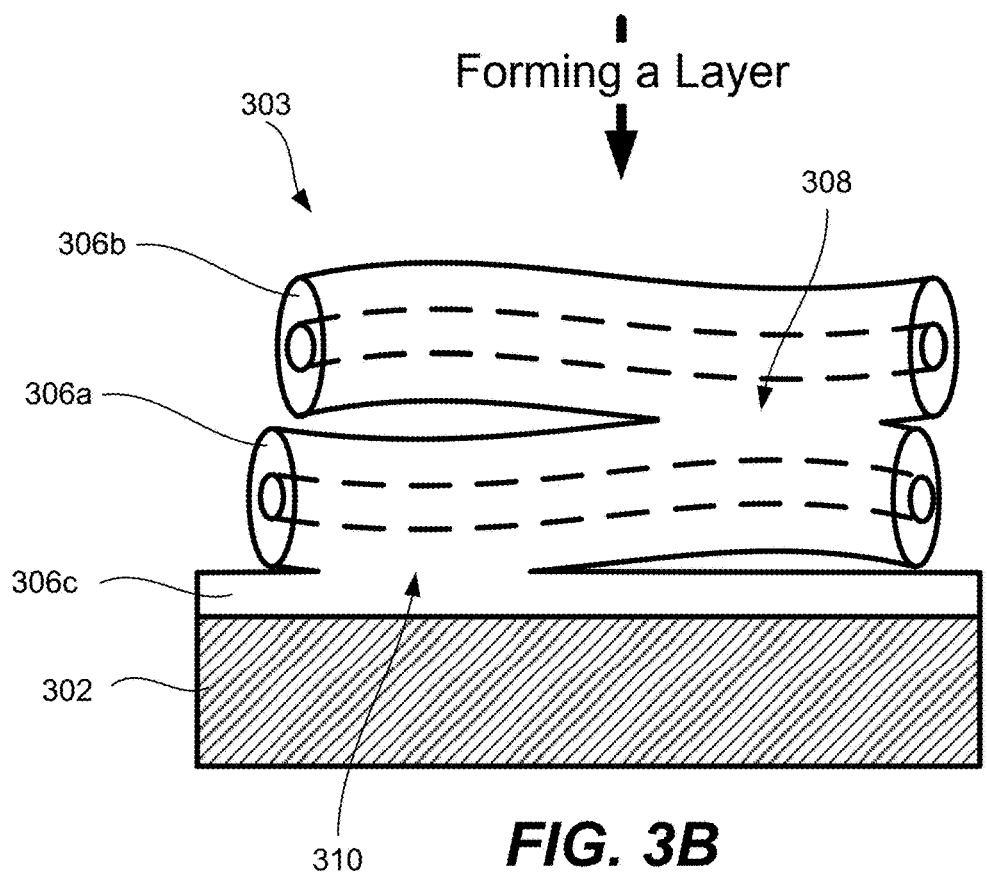
FIG. 3B is a schematic representation of an electrode layer containing interconnected hollow nanostructures formed around the two templates and on the substrate surface that has two joint structures in accordance with certain embodiments.

FIG. 3A illustrates an initial assembly 301 that includes a substrate 302 and two template structures 304a and 304b prior to formation of the active material coating around the structures. In certain embodiments, this assembly 301 is provided as a template. The structures 304a and 304b are shown to have variable spacing between the structures and between the bottom structure 304a and the substrate 302. In some areas this spacing is less than two thicknesses of the high capacity coating, which will result in formation of joint structures in these locations.

FIG. 3B illustrates a processed assembly 303 after forming the high capacity coating that includes three layers 306a, 306b, and 306c. The original template structures 304a and 304b may or may not be present in this assembly 303. The coating layers are shown to form two joint structures 308 and 310. Specifically, the joint structure 308 is formed when the layers 306a and 306b overlap. As indicated above, the template structures 304a and 304b were spaced apart by less than two coating thicknesses at this location. Likewise, the joint structure 310 was formed when layers 306a and 306c overlap caused by the spacing between the bottom template structure 304a and the substrate 302. These joint structures 308 and 310 can provide both mechanical support for the resulting hollow nanostructures and electronic pathways between the lithiation sites and the substrate 302.

In certain embodiments (not shown), a template may include at least two different types of template structures. One type may have large surface areas available for coating, i.e., surface template structures. These surface template structures can be larger, have higher aspect ratios, and have predominant presence in the template in order to provide enough surface area. Another type of structures may be primarily used to increase a number of joint structures formed in the electrode layer, i.e., interconnecting template structures. Interconnecting template structures may be generally smaller and have low aspect ratios in order to fit between the surface template structures. For example, nanofibers may be used in combination with nanoparticles as a composite template to achieve this result.

High capacity coating may be formed using various deposition techniques, such as chemical vapor deposition (CVD), which includes plasma enhanced CVD (PECVD) and thermal CVD, electroplating, electroless plating, and/or solution deposition techniques. PECVD technique examples will now be described in more details. A template is heated to between about 200° C. and 400° C. or, more specifically, to between about 250° C. and 350° C. A process gas with a silicon containing precursor (e.g., silane) and one or more carrier gases (e.g., argon, nitrogen, helium, and carbon dioxide) is introduced into the process chamber. In a specific example, a combination of silane and helium is used with a silane concentration of between about 5% and 20%, or more particularly between about 8% and 15%. The process gas may also include a dopant containing material, such as phosphine. The chamber pressure may be maintained at between about 0.1 Torr to 10 Torr or, more specifically, at between about 0.5 Torr and 2 Torr. To enhance silane decomposition, plasma may be ignited in the chamber. Using plasma may help lowering the template temperature, which may be important to preserve template integrity. In certain embodiments, a pulsed PECVD method is employed.

The following process (i.e., RF power and flow rates) parameters are provided for a STS MESC Multiplex CVD system available from Surface Technology Systems in Newport, United Kingdom. This system can process templates/substrates that are up to four inches in diameter. It should be understood by one having ordinary skills in the art that these process parameters can be scaled up or down for other types chambers and substrate sizes. The RF power may be maintained at between about 10 W and 100 W and the overall process gas flow rate may be kept at between about 200 sccm and 1000 sccm or, more particularly, at between about 400 sccm and 700 sccm.

In a specific embodiment, forming an amorphous silicon coating is performed in a process chamber maintained at a pressure of about 1 Torr. The process gas contains about 50 sccm of silane and about 500 sccm of helium. In order to dope the active material, about 50 sccm of 15% phosphine may be added to the process gas. The substrate is kept at about 300° C. The RF power level is set to about 50 Watts.

As mentioned above, it is sometimes needed to control process conditions, at least initially, during operation 106 in order to avoid major shape distortions of template structures, especially polymer-based template structures. At some point during the coating formation operating, an initially formed coating can be relied on for further mechanical support, and the process conditions can be adjusted without further concerns about the shape distortions. For example, the process conditions may be adjusted to increase the deposition rate of the coating.

In certain embodiments, operation 106 involves two or more stages performed using different process conditions, e.g., an initial deposition stage and a bulk deposition stage, also termed a first stage and a second stage. In one example, forming the high capacity coating begins at a lower temperature and, at some point during operation 106, the temperature is increased. The changes in the process conditions may be gradual or stepwise. The changes may be implemented when at least about 10% of the coating is formed or, more particularly, when at least about 25% or even when at least about 50% of the coating layer is formed (e.g., based on the coating thickness or weight). In certain embodiments, the initial stage is performed when the template is heated to less than about 250° C. or, more particularly, to less than about 200° C. or even to less than about 150° C. The temperature may be then increased to at least about 150° C. or, more particularly, to at least about 200° C. or even to at least about 250° C. The initial deposition stage will generally be performed under conditions that maintain the physical integrity of the template. In such embodiments, those conditions are maintained until the coating becomes self-supporting. After that point, more aggressive conditions may be employed to, e.g., increase the deposition rate. These more aggressive conditions in the bulk deposition stage can be employed without regard to the physical integrity of the template. Note that the template is largely sacrificial in many embodiments. After it serves the role of defining a form for the active material, it becomes expendable.

Figure 4:
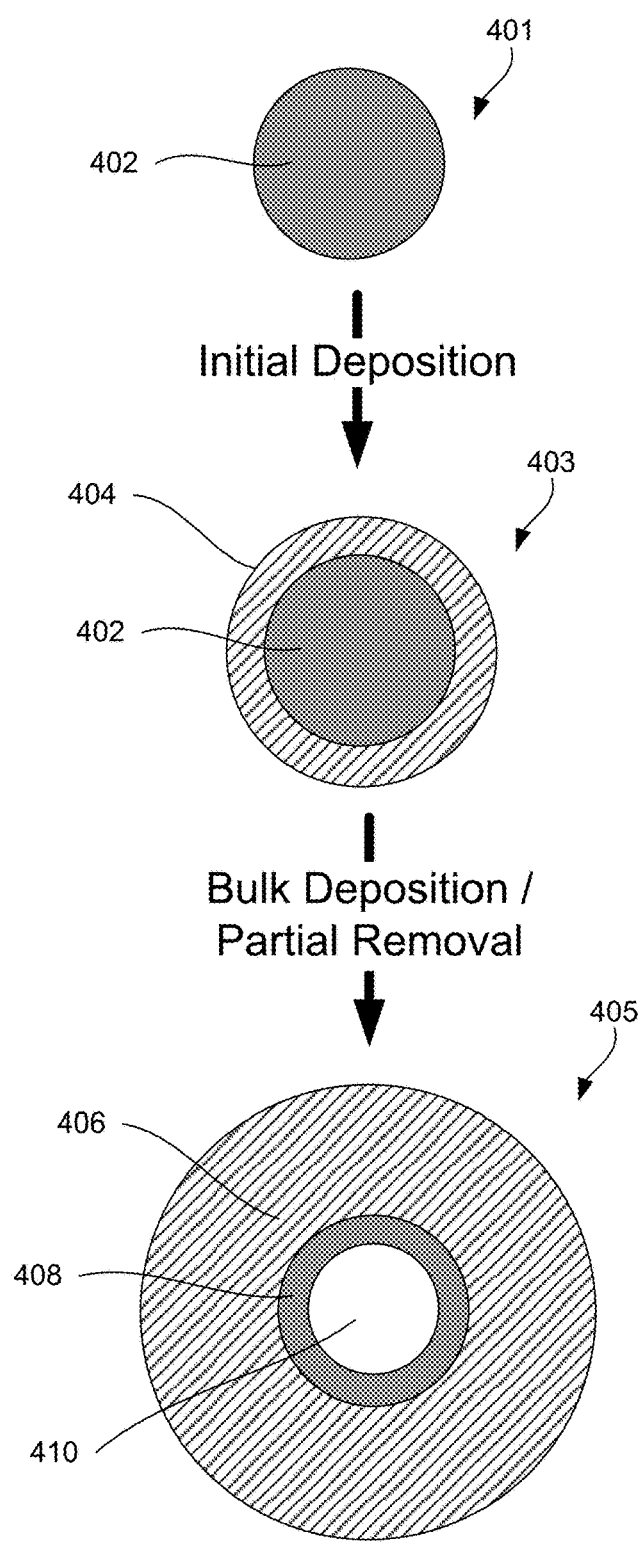
FIG. 4 is a schematic representation of a structure at three different illustrative stages of the electrode layer fabrication process in accordance with certain embodiments.

FIG. 4 is a schematic representation of a structure at three illustrative stages of the electrode layer fabrication process in accordance with certain embodiments, which show an example of the template deformation, more specifically partial removal of the template, during the coating operation. It should be noted that in general the template can be partially or completely removed and/or shrunk during the coating formation. Alternatively, the template may remain completely intact during this operation. In these later embodiments, the template is then at least partially or completely removed and/or shrunk in later operations. It should be noted that in addition or instead of changing the template shape, the template may also change its composition during operation 106, e.g., carbonize, or during later operations.

The first stage 401 shows an uncoated template structure 402. This stage may exist prior to initiating operation 106. The template structure 402 may be solid as shown in FIG. 4 or hollow (not shown). At the second illustrative stage 403, the same template structure 402 is shown with a thin coating 404 of the high capacity material formed around the structure 402. As mentioned above, the process conditions may be selected such that no substantial shape deformation to the template structure 402 appears at this stage. At this stage 403, the initially formed coating 404 may be sufficiently strong to support itself with or without any help from the structure 402. The process conditions, therefore, can be changed at this point. The new process conditions may cause substrate removal and/or shrinkage of the template, which results in a cavity 410 formed within the remaining template structure 408 as shown in the third illustrative stage 405. Most of the coating may be formed in between the second and third stages resulting in the final coating 406.

Returning to FIG. 1, the process 100 may continue with partial or complete removal and/or shrinkage of the template material from the electrode layer in operation 108. This operation is optional. As noted above, removal and/or shrinking may also occur during the coating formation in operation 106. In certain embodiments, no additional removal and/or shrinkage are needed. In other embodiments, removal and/or shrinkage occur during operation 106 and again in operation 108. In yet other embodiments, removal and/or shrinkage are performed only during operation 108 and the template stays intact during operation 106. For example, a metallic template used to form an amorphous silicon layer may be unaffected by the layer formation and can be removed later by etching.

A removal/shrinking technique during operation 108 depends, in part, on template and coating materials. For example, polymeric templates can be burned out or annealed at high temperature, e.g., by heating to at least about 300° C. or, more particularly, to at least about 400° C. or even to at least about 500° C. It may take at least about 1 hour or, more particularly, at least about 4 hours to burn out sufficient amount of the template materials. In certain embodiments, a template (e.g., a metallic template) is removed by chemical etching. For example, a silicon oxide core template may be etched by a hydrofluoric (HF) acid solution. In general, acid solutions can be used to etch away various metal or silicide fibers used as initial templates.

In certain embodiments, substantially all template material is removed from the nanotubular structure. In other embodiments, a portion of the template material remains. It should be noted that this remaining material may have a different composition than initial template materials (e.g., a polymer may be converted into carbon, etc.). In the same or other embodiments, residual template materials or their derivatives make up less than about 25% or, more particularly, less than about 10% by weight of the electrode layer. These residual materials may be used to enhance electronic conductivity and electrochemical capacity to the electrode layer, protect from undesirable SEI layer formations, limited the structural change (such as volume expansion), and other purposes.

The process 100 may continue with forming a second coating over the interconnected hollow nanostructures in operation 110. A second coating may be formed on the outer surfaces of the nanostructures and therefore referred to as an outer coating. In general, the second coating may include carbon, metals (e.g., copper, titanium), metal oxides (e.g., titanium oxide, silicon oxide), and metal nitrides, and metal carbides. In certain embodiments, a carbon content of the outer coating is at least about 50% or, in more specific embodiments, at least about 90% or at least about 99%. In certain specific embodiments, the outer coating may include graphite, graphene, graphene oxide, metal oxide (e.g., titanium oxide), and or other materials. The outer coating may coat substantially all exposed surface (e.g., all outside surfaces or both inside and outside surfaces) of the interconnected hollow nanostructures. In certain embodiments, the thickness of the outer coating is between about 1 nanometer and 100 nanometers or, in more specific embodiments between about 2 nanometers and 50 nanometers. Specifically, the outer coating could be used to prevent a direct contact of the high capacity coating with solvents of the electrolyte (and forming a detrimental SEI layer) yet to allow electro-active ions to pass to and from the high capacity coating.

A technique for forming an outer coating may involve depositing carbon based small molecules (e.g., sugars) or polymers followed by annealing. Another technique may involve carbon-based gas pyrolysis (e.g., using acetylene). For example, a carbon containing outer coating may be formed using methane, ethane, or any other suitable carbon containing precursors passed over nickel, chromium, molybdenum, or any other suitable catalysts (or no catalyst at all) and deposit a carbon layer over the nanostructures. Other methods include coating the nanostructures with organic media, which are later baked leaving carbon residue. For example, interconnected nanostructures may be dipped into a glucose or polymer solution. After allowing the solution to penetrate into the nanowire mesh, it is removed from the solution and baked. Glucose leaves carbon residues on the nanostructures. Outer coatings containing oxides, such as titanium oxide, may start with depositing a base material (e.g., titanium) from a solution, using an atomic layer deposition (ALD), or metal plating. Oxides of the base materials are then formed, for example, by exposing the deposit to oxidants at elevated temperature. Silicon oxide can be formed during operation 108 and/or other coating operations that involve, for example, CVD, ALD, or other deposition techniques.

Other operations in the process 100 that are specifically reflected in FIG. 1 may include compressing the electrode layer, further functionalizing the layer, and forming a battery electrode out of the electrode layer. Additional downstream operations are explained below in the context of electrode and battery arrangement description.

Electrode Layer Examples

The process described above can be used to prepare an electrode layer of interconnected hollow nanostructures containing high capacity active material. Hollow nanostructures can have a shape of hollow spheres, tubes, or other shapes, both regular and irregular. A largest inner cross-sectional dimension of the cavities (e.g., an inner diameter for round structures) of the hollow nanostructures may be between about 1 nanometer and 1000 nanometers or, more particularly, between about 5 nanometers and 500 nanometers or even between about 10 nanometers and 100 nanometers. The cavities provide free space for active materials to expand into without causing substantial interference (e.g., pushing on) to other nanostructures or causing pulverization of the nanostructure itself. In specific embodiments, some or all of the hollow nanostructures (e.g., at least about 50% of them) have cross-sectional dimensions and/or sizes of openings into the hollow cavities that are too small for electrolyte to penetrate and fill the hollow cavities when the electrode layer is assembled into a battery. As such, the hollow cavities of the hollow nanostructures may remain substantially free from electrolyte, at least during normal battery operation.

In certain embodiments, the hollow nanostructures have a defined shell thickness. While other dimensions of the nanostructures may be sufficiently large (e.g., several micrometer and even millimeters), the shell thickness is generally less than about 1000 nanometers. As mentioned above, a thin shell may minimize pulverization of the high capacity active materials during cycling. In certain embodiments, shells have a thickness of between about 5 nanometers and 1000 nanometers on average or, more particularly, between about 10 nanometers and 500 nanometers or even between about 50 nanometers and 250 nanometers. A porosity of the electrode layer may be between about 20% and 90% including the hollow cavities of the nanostructures. In more specific embodiments, the porosity is between about 40% and 80%.

In certain embodiments, nanostructures have a substantially tubular shape. These nanotubes can be at least about 100 nanometers long or, more particularly, at least about 1 micrometer long or even at least about 50 micrometers long. The nanotubes may have joint structures along their lengths. The joint structures provide physical or metallurgical bonding between adjacent nanostructures. Generally, the joint structure provides a direct electronic pathway between the adjacent structures, without requiring the presence of an external conductive agent (such as carbon black) to provide a conductive pathway between the adjacent structures.

An electrode layer may be bound to a conductive substrate. In certain embodiments, a conductive substrate has two electrode layers on each side of the substrate. Various substrate examples are provided above. Electrode layers, which are sometimes referred to as active layers, can be used as positive or negative electrodes in a battery as well as solid electrolytes, which are further described below.

Rechargeable batteries assembled with these novel electrode layers can maintain a stable electrochemical capacity of at least about 2000 mAh/g for at least 100 cycles (based on the total weight of all active materials present in the electrode layer). In the same or other embodiments, batteries can maintain a stable electrochemical capacity of at least about 700 mAh/g for at least about 100 cycles.

Electrode and Battery Arrangements

Figure 5A:
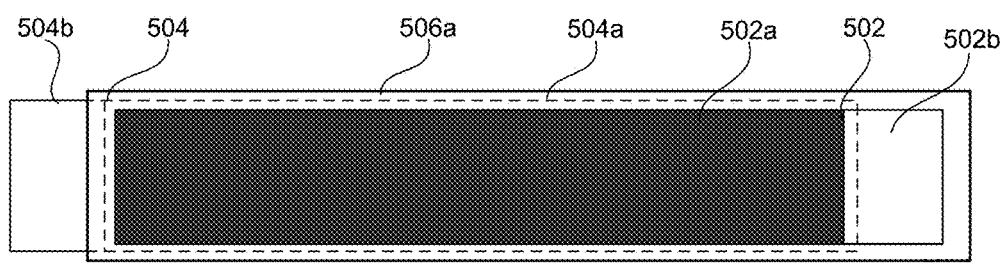
FIGS. 5A-5B are top and side schematic views of an illustrative electrode arrangement in accordance with certain embodiments.

Electrode layer described above can be used to form positive and/or negative battery electrodes. The battery electrodes are then typically assembled into a stack or a jelly roll. FIG. 5A illustrates a side view of an aligned stack including a positive electrode 502, a negative electrode 504, and two sheets of the separator 506a and 506b in accordance with certain embodiments. The positive electrode 502 may have a positive electrode layer 502a and a positive uncoated substrate portion 502b. Similarly, the negative electrode 504 may have a negative electrode layer 504a and a negative uncoated substrate portion 504b. In many embodiments, the exposed area of the negative electrode layer 504a is slightly larger that the exposed area of the positive electrode layer 502a to ensure trapping of the lithium ions released from the positive electrode layer 502a by insertion material of the negative electrode layer 504a. In one embodiment, the negative electrode layer 504a extends at least between about 0.25 and 5 mm beyond the positive electrode layer 502a in one or more directions (typically all directions). In a more specific embodiment, the negative layer extends beyond the positive layer by between about 1 and 2 mm in one or more directions. In certain embodiments, the edges of the separator sheets 506a and 506b extend beyond the outer edges of at least the negative electrode layer 504a to provide electronic insulation of the electrode from the other battery components. The positive uncoated portion 502b may be used for connecting to the positive terminal and may extend beyond negative electrode 504 and/or the separator sheets 506a and 506b. Likewise, the negative uncoated portion 504b may be used for connecting to the negative terminal and may extend beyond positive electrode 502 and/or the separator sheets 506a and 506b.

Figure 5B:
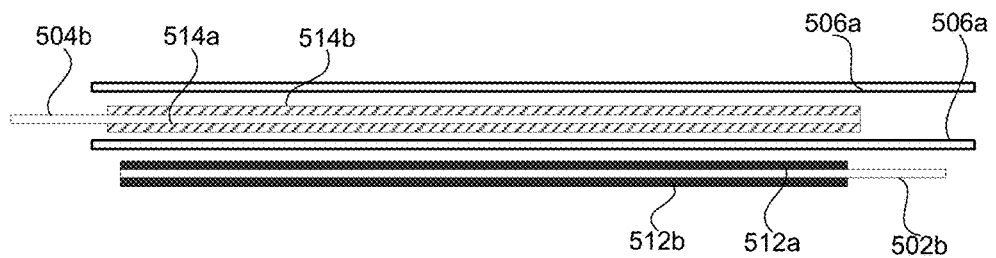

FIG. 5B illustrates a top view of the aligned stack. The positive electrode 502 is shown with two positive electrode layers 512a and 512b on opposite sides of the flat positive current collector 502b. Similarly, the negative electrode 504 is shown with two negative electrode layer 514a and 514b on opposite sides of the flat negative current collector. Any gaps between the positive electrode layer 512a, its corresponding separator sheet 506a, and the corresponding negative electrode layer 514a are usually minimal to nonexistent, especially after the first cycle of the cell. The electrodes and the separators are either tightly would together in a jelly roll or are positioned in a stack that is then inserted into a tight case. The electrodes and the separator tend to swell inside the case after the electrolyte is introduced and the first cycles remove any gaps or dry areas as lithium ions cycle the two electrodes and through the separator.

Figure 6A:
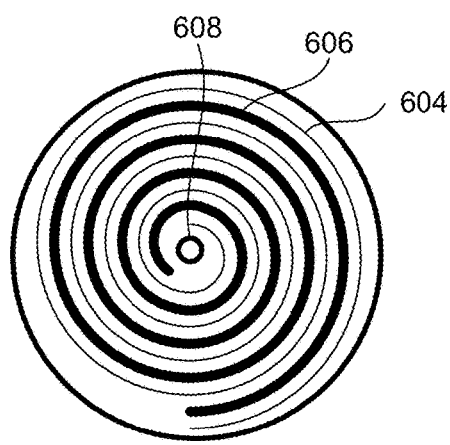
FIGS. 6A-6B are top and perspective schematic views of an illustrative round wound cell in accordance with certain embodiments.
Figure 6B:
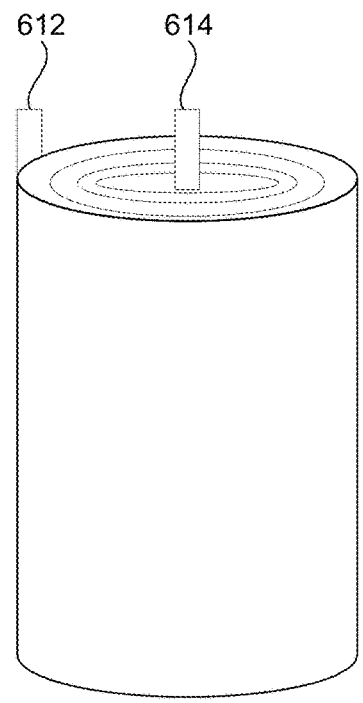

A wound design is a common arrangement. Long and narrow electrodes are wound together with two sheets of separator into a sub-assembly, sometimes referred to as a jellyroll, shaped and sized according to the internal dimensions of a curved, often cylindrical, case. FIG. 6A shows a top view of a jelly roll comprising a positive electrode 606 and a negative electrode 604. The white spaces between the electrodes represent the separator sheets. The jelly roll is inserted into a case 602. In some embodiments, the jellyroll may have a mandrel 608 inserted in the center that establishes an initial winding diameter and prevents the inner winds from occupying the center axial region. The mandrel 608 may be made of conductive material, and, in some embodiments, it may be a part of a cell terminal. FIG. 6B presents a perspective view of the jelly roll with a positive tab 612 and a negative tab 614 extending from the jelly roll. The tabs may be welded to the uncoated portions of the electrode substrates.

The length and width of the electrodes depend on the overall dimensions of the cell and thicknesses of electrode layers and current collector. For example, a conventional 18650 cell with 18 mm diameter and 65 mm length may have electrodes that are between about 300 and 1000 mm long. Shorter electrodes corresponding to low rate/higher capacity applications are thicker and have fewer winds.

A cylindrical design may be desirable for some lithium ion cells because the electrodes swell during cycling and exert pressure on the casing. A round casing may be made sufficiently thin and still maintain sufficient pressure. Prismatic cells may be similarly wound, but their case may bend along the longer sides from the internal pressure. Moreover, the pressure may not be even within different parts of the cells and the corners of the prismatic cell may be left empty. Empty pockets may not be desirable within the lithium ions cells because electrodes tend to be unevenly pushed into these pockets during electrode swelling. Moreover, the electrolyte may aggregate and leave dry areas between the electrodes in the pockets negative effecting lithium ion transport between the electrodes. Nevertheless, for certain applications, such as those dictated by rectangular form factors, prismatic cells are appropriate. In some embodiments, prismatic cells employ stacks rectangular electrodes and separator sheets to avoid some of the difficulties encountered with wound prismatic cells.

Figure 7:
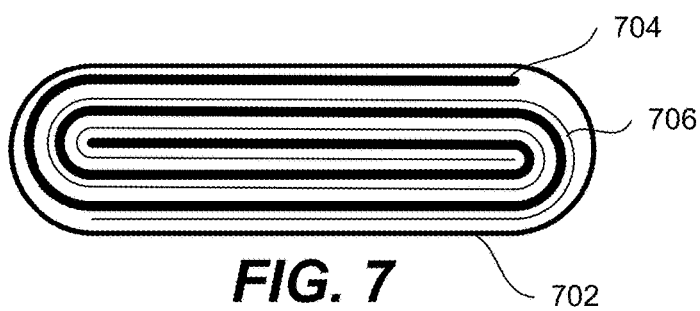
FIG. 7 is a top schematic view of an illustrative prismatic wound cell in accordance with certain embodiments.

FIG. 7 illustrates a top view of a wound prismatic jellyroll. The jelly roll comprises a positive electrode 704 and a negative electrode 706. The white space between the electrodes is representative of the separator sheets. The jelly roll is inserted into a rectangular prismatic case. Unlike cylindrical jellyrolls shown in FIGS. 6A and 6B, the winding of the prismatic jellyroll starts with a flat extended section in the middle of the jelly roll. In one embodiment, the jelly roll may include a mandrel (not shown) in the middle of the jellyroll onto which the electrodes and separator are wound.

Figure 8A:
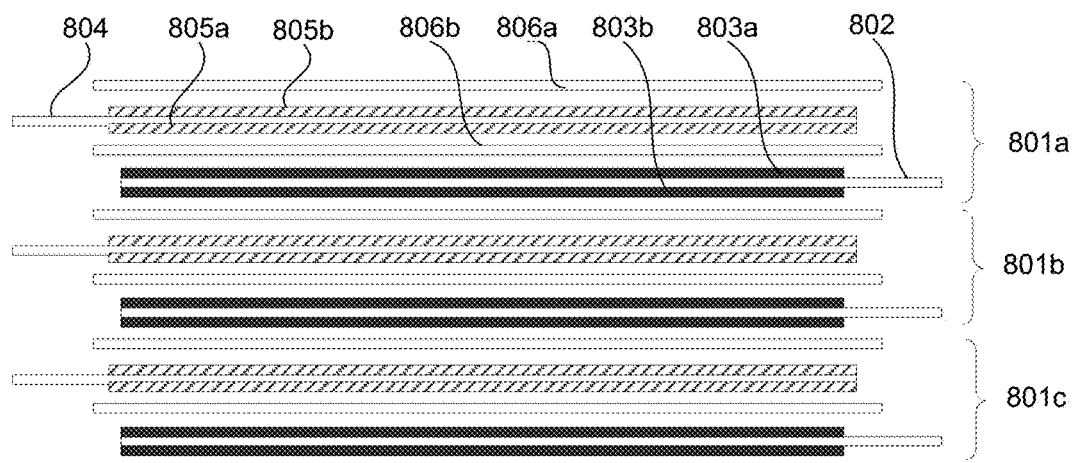
FIGS. 8A-8B are top and perspective schematic views of an illustrative stack of electrodes and separator sheets in accordance with certain embodiments.
Figure 8B:
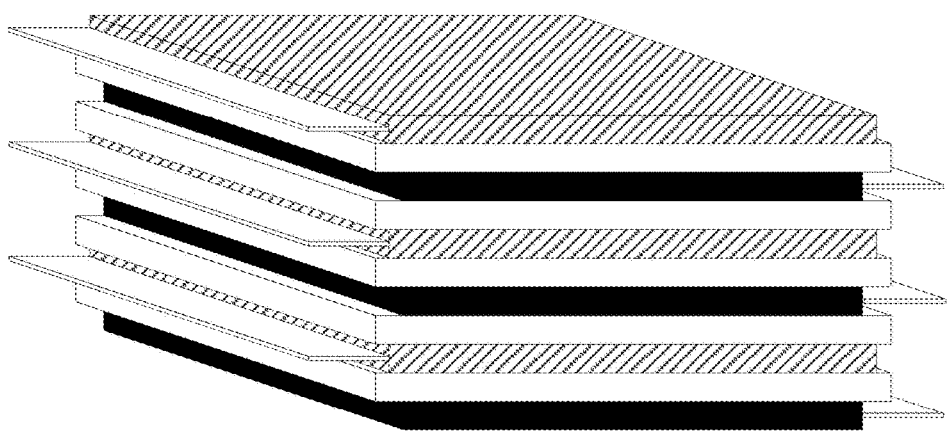

FIG. 8A illustrates a side view of a stacked cell including a plurality of sets (801a, 801b, and 801c) of alternating positive and negative electrodes and a separator in between the electrodes. One advantage of a stacked cell is that its stack can be made to almost any shape, and is particularly suitable for prismatic cells. However, such cell typically requires multiple sets of positive and negative electrodes and a more complicated alignment of the electrodes. The current collector tabs typically extend from each electrode and connected to an overall current collector leading to the cell terminal.

Once the electrodes are arranged as described above, the cell is filled with electrolyte. The electrolyte in lithium ions cells may be liquid, solid, or gel. The lithium ion cells with the solid electrolyte also referred to as a lithium polymer cells.

A typical liquid electrolyte comprises one or more solvents and one or more salts, at least one of which includes lithium. During the first charge cycle (sometimes referred to as a formation cycle), the organic solvent in the electrolyte can partially decompose on the negative electrode surface to form a solid electrolyte interphase layer (SEI layer). The interphase is generally electrically insulating but ionically conductive, allowing lithium ions to pass through. The interphase also prevents decomposition of the electrolyte in the later charging sub-cycles.

Some examples of non-aqueous solvents suitable for some lithium ion cells include the following: cyclic carbonates (e.g., ethylene carbonate (EC), propylene carbonate (PC), butylene carbonate (BC) and vinylethylene carbonate (VEC)), vinylene carbonate (VC), lactones (e.g., gamma-butyrolactone (GBL), gamma-valerolactone (GVL) and alpha-angelica lactone (AGL)), linear carbonates (e.g., dimethyl carbonate (DMC), methyl ethyl carbonate (MEC), diethyl carbonate (DEC), methyl propyl carbonate (MPC), dipropyl carbonate (DPC), methyl butyl carbonate (NBC) and dibutyl carbonate (DBC)), ethers (e.g., tetrahydrofuran (THF), 2-methyltetrahydrofuran, 1,4-dioxane, 1,2-dimethoxyethane (DME), 1,2-diethoxyethane and 1,2-dibutoxyethane), nitrites (e.g., acetonitrile and adiponitrile) linear esters (e.g., methyl propionate, methyl pivalate, butyl pivalate and octyl pivalate), amides (e.g., dimethyl formamide), organic phosphates (e.g., trimethyl phosphate and trioctyl phosphate), and organic compounds containing an S=O group (e.g., dimethyl sulfone and divinyl sulfone), and combinations thereof.

Non-aqueous liquid solvents can be employed in combination. Examples of the combinations include combinations of cyclic carbonate-linear carbonate, cyclic carbonate-lactone, cyclic carbonate-lactone-linear carbonate, cyclic carbonate-linear carbonate-lactone, cyclic carbonate-linear carbonate-ether, and cyclic carbonate-linear carbonate-linear ester. In one embodiment, a cyclic carbonate may be combined with a linear ester. Moreover, a cyclic carbonate may be combined with a lactone and a linear ester. In a specific embodiment, the ratio of a cyclic carbonate to a linear ester is between about 1:9 to 10:0, preferably 2:8 to 7:3, by volume.

A salt for liquid electrolytes may include one or more of the following: $LiPF_6$, $LiBF_4$, $LiClO_4$ $LiAsF_6$, $LiN(CF_3SO_2)_2$, $LiN(C_2F_5SO_2)_2$, $LiCF_3SO_3$, $LiC(CF_3SO_2)_3$, $LiPF_4(CF_3)_2$, $LiPF_3(C_2F_5)_3$, $LiPF_3(CF_3)_3$, $LiPF_3(iso-C_3F_7)_3$, $LiPF_5(iso-C_3F_7)$, lithium salts having cyclic alkyl groups (e.g., $(CF_2)_2(SO_2)_{2x}Li$ and $(CF_2)_3(SO_2)_{2x}Li$), and combination of thereof. Common combinations include $LiPF_6$ and $LiBF_4$, $LiPF_6$ and $LiN(CF_3SO_2)_2$, $LiBF_4$ and $LiN(CF_3SO_2)_2$.

In one embodiment the total concentration of salt in a liquid nonaqueous solvent (or combination of solvents) is at least about 0.3 M; in a more specific embodiment, the salt concentration is at least about 0.7M. The upper concentration limit may be driven by a solubility limit or may be no greater than about 2.5 M: in a more specific embodiment, no more than about 1.5 M.

A solid electrolyte is typically used without the separator because it serves as the separator itself. It is electrically insulating, ionically conductive, and electrochemically stable. In the solid electrolyte configuration, a lithium containing salt, which could be the same as for the liquid electrolyte cells described above, is employed but rather than being dissolved in an organic solvent, it is held in a solid polymer composite. Examples of solid polymer electrolytes may be ionically conductive polymers prepared from monomers containing atoms having lone pairs of electrons available for the lithium ions of electrolyte salts to attach to and move between during conduction, such as Polyvinylidene fluoride (PVDF) or chloride or copolymer of their derivatives, Poly(chlorotrifluoroethylene), poly(ethylene-chlorotrifluoro-ethylene), or poly(fluorinated ethylene-propylene), Polyethylene oxide (PEO) and oxymethylene linked PEO, PEO-PPO-PEO crosslinked with trifunctional urethane, Poly(bis(methoxy-ethoxy-ethoxide))-phosphazene (MEEP), Triol-type PEO crosslinked with difunctional urethane, Poly((oligo)oxyethylene)methacrylate-co-alkali metal methacrylate, Polyacrylonitrile (PAN), Polymethylmethacrylate (PNMA), Polymethylacrylonitrile (PMAN), Polysiloxanes and their copolymers and derivatives, Acrylate-based polymer, other similar solvent-free polymers, combinations of the foregoing polymers either condensed or cross-linked to form a different polymer, and physical mixtures of any of the foregoing polymers. Other less conductive polymers may be used in combination with the above polymers to improve strength of thin laminates include: polyester (PET), polypropylene (PP), polyethylene napthalate (PEN), polyvinylidene fluoride (PVDF), polycarbonate (PC), polyphenylene sulfide (PPS), and polytetrafluoroethylene (PTFE).

Figure 9:
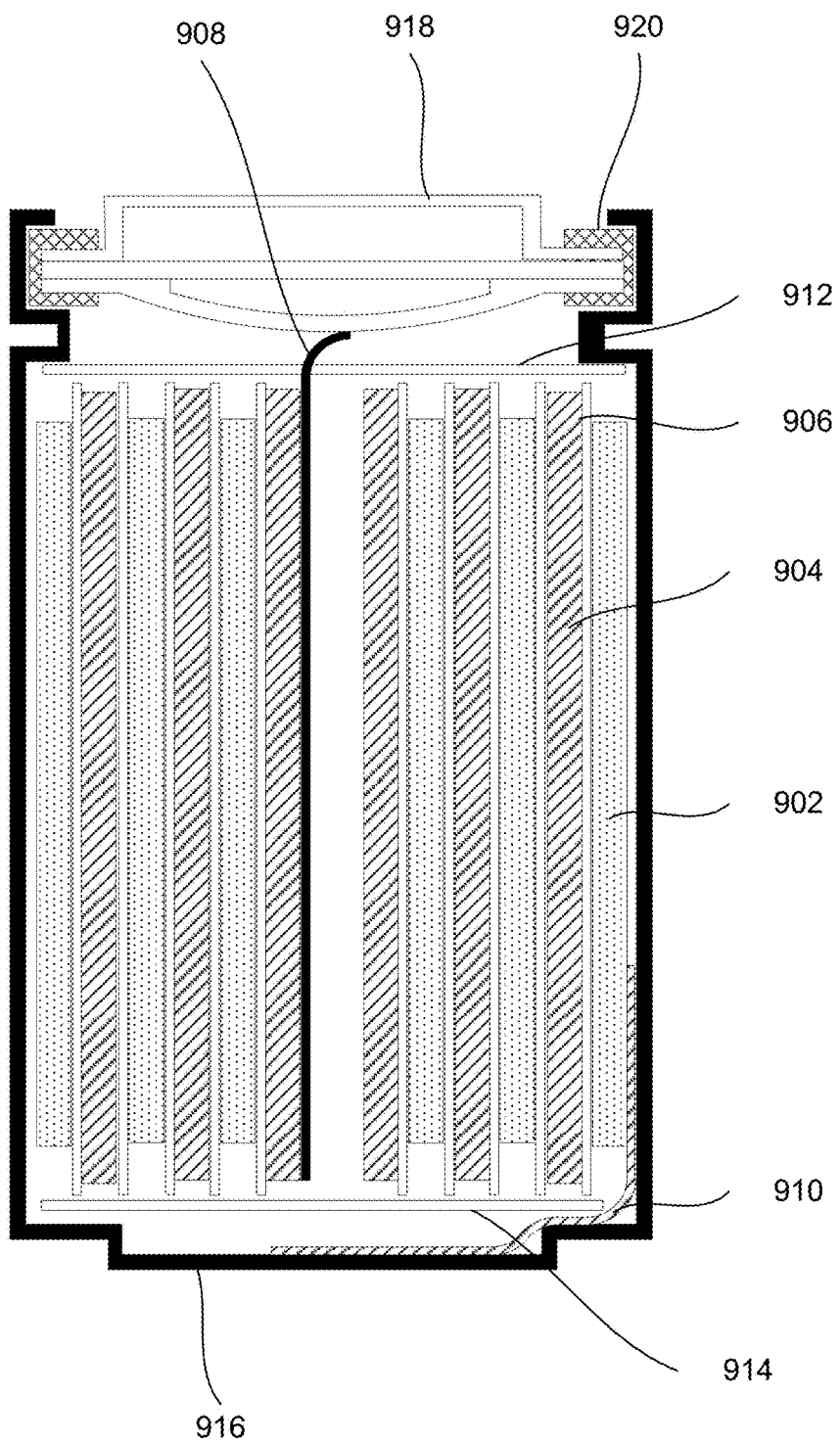
FIG. 9 is a schematic cross-section view of an example of a wound cell in accordance with embodiments.

FIG. 9 illustrates a cross-section view of the wound cylindrical cell in accordance with one embodiment. A jelly roll comprises a spirally wound positive electrode 902, a negative electrode 904, and two sheets of the separator 906. The jelly roll is inserted into a cell case 916, and a cap 918 and gasket 920 are used to seal the cell. It should be note that in certain embodiments a cell is not sealed until after subsequent operations (i.e., operation 208). In some cases, cap 912 or case 916 includes a safety device. For example, a safety vent or burst valve may be employed to break open if excessive pressure builds up in the battery. In certain embodiments, a one-way gas release valve is included to release oxygen released during activation of the positive material. Also, a positive thermal coefficient (PTC) device may be incorporated into the conductive pathway of cap 918 to reduce the damage that might result if the cell suffered a short circuit. The external surface of the cap 918 may used as the positive terminal, while the external surface of the cell case 916 may serve as the negative terminal. In an alternative embodiment, the polarity of the battery is reversed and the external surface of the cap 918 is used as the negative terminal, while the external surface of the cell case 916 serves as the positive terminal. Tabs 908 and 910 may be used to establish a connection between the positive and negative electrodes and the corresponding terminals. Appropriate insulating gaskets 914 and 912 may be inserted to prevent the possibility of internal shorting. For example, a Kapton™ film may used for internal insulation. During fabrication, the cap 918 may be crimped to the case 916 in order to seal the cell. However prior to this operation, electrolyte (not shown) is added to fill the porous spaces of the jelly roll.

A rigid case is typically required for lithium ion cells, while lithium polymer cells may be packed into a flexible, foil-type (polymer laminate) case. A variety of materials can be chosen for the case. For lithium-ion batteries, Ti-6-4, other Ti alloys, Al, Al alloys, and 300 series stainless steels may be suitable for the positive conductive case portions and end caps, and commercially pure Ti, Ti alloys, Cu, Al, Al alloys, Ni, Pb, and stainless steels may be suitable for the negative conductive case portions and end caps.

In addition to the battery applications described above, metal silicides may be used in fuel cells (e.g., for negative electrodes, positive electrodes, and electrolytes), heterojunction solar cell active materials, various forms of current collectors, and/or absorption coatings. Some of these applications can benefit from a high surface area provided by metal silicide structures, high conductivity of silicide materials, and fast inexpensive deposition techniques.

CONCLUSION

Although the foregoing invention has been described in some detail for purposes of clarity of understanding, it will be apparent that certain changes and modifications may be practiced within the scope of the appended claims. It should be noted that there are many alternative ways of implementing the processes, systems and apparatus of the present invention. Accordingly, the present embodiments are to be considered as illustrative and not restrictive, and the invention is not to be limited to the details given herein.

What is claimed is:

1. An electrode layer for use in a rechargeable battery, the electrode layer comprising:
   a plurality of interconnected hollow tubular nanostructures having shells around internal cavities, wherein the shells comprise high capacity electrochemically active material, wherein the high capacity electrochemically active material comprises one or more materials selected from the group consisting of silicon, tin, and germanium, wherein all of the interconnected hollow tubular nanostructures in the electrode layer are interconnected by the high capacity electrochemically active material, and
   wherein the internal cavities provide free space for the high capacity electrochemically active material to swell into during cycling of the rechargeable battery and wherein the hollow tubular nanostructures are characterized by one or more of the following characteristics: 1) an aspect ratio of at least about four and a length of at least about 5 micrometers and 2) a largest inner cross-sectional dimension between about 5 nanometers and 500 nanometers.

2. The electrode layer of claim 1, wherein the internal cavities are substantially inaccessible to an electrolyte of the rechargeable battery.

3. The electrode layer of claim 1, wherein the electrode layer is configured to provide a stable energy capacity of at least about 2000 mAh/g after at least 100 cycles based on the weight of the high capacity electrochemically active material.

4. The electrode layer of claim 1, further comprising an outer layer substantially covering an outer surface of the interconnected hollow tubular nanostructures, wherein the outer layer comprising one or more materials selected from the group consisting of carbon, titanium, silicon, aluminum, and copper.

5. The electrode layer of claim 1, wherein the electrode layer has a porosity of between about 20% and 80%.

6. The electrode layer of claim 1, wherein the rechargeable battery is a lithium ion battery and the high capacity electrochemically active material is a negative active material.

7. A rechargeable lithium ion battery comprising:
   an electrode layer comprising:
   a plurality of interconnected hollow tubular nanostructures having shells around internal cavities, wherein the shells comprise high capacity electrochemically active material, wherein all of the interconnected hollow tubular nanostructures in the electrode layer are interconnected by the high capacity electrochemically active material, wherein the high capacity electrochemically active material comprises one or more materials selected from the group consisting of silicon, tin, and germanium, and
   wherein the internal cavities provide free space for the high capacity electrochemically active material to swell into during cycling of the rechargeable battery and wherein the hollow tubular nanostructures are characterized by one or more of the following characteristics: 1) an aspect ratio of at least about four and a length of at least about 5 micrometers and 2) a largest inner cross-sectional dimension between about 5 nanometers and 500 nanometers.

8. An electrode layer for use in a rechargeable battery, the electrode layer comprising:
   interconnected hollow nanostructures having shells around internal cavities, wherein the shells comprise a high capacity electrochemically active material; and
   a substrate underlying the interconnected hollow nanostructures,
   wherein all of the interconnected hollow nanostructures in the electrode layer are interconnected at points above the substrate by first structures, the first structures including one or more of metals and the high capacity electrochemically active material, wherein the high capacity electrochemically active material comprises one or more materials selected from the group consisting of silicon, tin, and germanium, and wherein the internal cavities provide free space for the high capacity electrochemically active material to swell into during cycling of the rechargeable battery and wherein the hollow nanostructures are characterized by one or more of the following characteristics: 1) an aspect ratio of at least about four and a length of at least about 5 micrometers and 2) a largest inner cross-sectional dimension between about 5 nanometers and 500 nanometers.

9. The electrode layer of claim 8, wherein the internal cavities are substantially inaccessible to an electrolyte of the rechargeable battery.

10. The electrode layer of claim 8, wherein the electrode layer is configured to provide a stable energy capacity of at least about 2000 mAh/g after at least 100 cycles based on the weight of the high capacity electrochemically active material.

11. The electrode layer of claim 8, further comprising an outer layer substantially covering an outer surface of the interconnected hollow nanostructures, wherein the outer layer comprising one or more material selected from the group consisting of carbon, titanium, silicon, aluminum, and copper.

12. The electrode layer of claim 8, wherein the electrode layer has a porosity of between about 20% and 80%.

13. The electrode layer of claim 8, wherein the rechargeable battery is a lithium ion battery and the high capacity electrochemically active material is a negative active material.

14. The electrode layer of claim 1, further comprising an outer layer substantially covering an outer surface of the interconnected hollow nanostructures, wherein the outer layer comprises one or more materials selected from the group consisting of carbon, a metal, a metal oxide, a metal nitride, and a metal carbide.

15. The electrode layer of claim 1, wherein the hollow nanostructures have an aspect ratio of at least about four and a length of at least about 5 micrometers.

16. The electrode layer of claim 1, wherein the hollow tubular nanostructures have a largest inner cross-sectional dimension between about 5 nanometers and 500 nanometers.

17. The electrode layer of claim 1, wherein the shells have a thickness between about 5 and 1000 nm.

18. The electrode layer of claim 1, wherein the silicon, tin, or germanium of the high capacity electrochemically active material of the shells directly contacts the internal cavities.

* * * * *